(12) United States Patent
Jang et al.

(10) Patent No.: US 12,464,240 B2
(45) Date of Patent: Nov. 4, 2025

(54) SENSOR DRIVING DEVICE INCLUDING SMA WIRES

(71) Applicant: LG INNOTEK CO., LTD., Seoul (KR)

(72) Inventors: Hyeon Jun Jang, Seoul (KR); Jung Cheol Kim, Seoul (KR); Jung Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 220 days.

(21) Appl. No.: 18/256,690

(22) PCT Filed: Dec. 9, 2021

(86) PCT No.: PCT/KR2021/018684
§ 371 (c)(1),
(2) Date: Jun. 9, 2023

(87) PCT Pub. No.: WO2022/124834
PCT Pub. Date: Jun. 16, 2022

(65) Prior Publication Data
US 2024/0040256 A1    Feb. 1, 2024

(30) Foreign Application Priority Data
Dec. 9, 2020 (KR) .................. 10-2020-0171220

(51) Int. Cl.
*H04N 23/68* (2023.01)
*G03B 13/36* (2021.01)
*H04N 23/54* (2023.01)
(52) U.S. Cl.
CPC ........... *H04N 23/687* (2023.01); *G03B 13/36* (2013.01); *H04N 23/54* (2023.01)

(58) Field of Classification Search
CPC ...... H04N 23/687; H04N 23/54; H04N 23/55; H04N 23/57; G03B 13/36;
(Continued)

(56) References Cited

U.S. PATENT DOCUMENTS 8,605,160 B2 * 12/2013 Kwon .................. H04N 23/685
348/208.99
9,933,689 B2    4/2018 Koepfer
(Continued)

FOREIGN PATENT DOCUMENTS

CN         107407851 A    11/2017
JP         2015-121818 A    7/2015
(Continued)

OTHER PUBLICATIONS

International Search Report dated Mar. 29, 2022 in International Application No. PCT/KR2021/018684.
(Continued)

*Primary Examiner* — Padma Haliyur
(74) *Attorney, Agent, or Firm* — Saliwanchik, Lloyd & Eisenschenk

(57) ABSTRACT

A sensor driving device according to an embodiment includes a fixed part including a first substrate on which a first lead pattern part and a first pad are formed; a moving part spaced apart from the fixed part and including a sensor; and a wire part disposed between the moving part and the fixed part, wherein the wire part includes a first wire part of a shape memory alloy having both ends connected to the first pad and moving the moving part with respect to the fixed part; and a second wire part having one end connected to the first lead pattern part and the other end connected to the moving part to elastically support the moving part.

20 Claims, 20 Drawing Sheets

(58) Field of Classification Search
CPC .... G03B 2205/0007; G03B 3/10; G03B 5/00;
G03B 2205/0076; G03B 30/00
See application file for complete search history.

(56) References Cited

U.S. PATENT DOCUMENTS

| | | | |
|---|---|---|---|
| 10,444,598 B1* | 10/2019 | Heo | G02B 7/08 |
| 2008/0198249 A1 | 8/2008 | Tanimura et al. | |
| 2008/0273092 A1* | 11/2008 | Chiou | H04N 23/58 |
| | | | 348/208.11 |
| 2015/0103195 A1* | 4/2015 | Kwon | H04N 23/54 |
| | | | 348/208.12 |
| 2015/0322929 A1 | 11/2015 | Morikawa et al. | |
| 2017/0133951 A1* | 5/2017 | Liu | G02B 7/09 |
| 2018/0052381 A1 | 2/2018 | Koepfer | |
| 2018/0171991 A1 | 6/2018 | Miller et al. | |
| 2020/0303445 A1* | 9/2020 | Kang | H10F 39/811 |
| 2021/0321024 A1 | 10/2021 | Song | |

FOREIGN PATENT DOCUMENTS

| | | |
|---|---|---|
| KR | 10-2011-0097555 A | 8/2011 |
| KR | 10-2015-0022637 A | 3/2015 |
| KR | 10-2018-0086762 A | 8/2018 |
| KR | 10-2019-0097113 A | 8/2019 |
| KR | 10-2020-0023922 A | 3/2020 |
| KR | 10-2020-0114251 A | 10/2020 |

OTHER PUBLICATIONS

Supplementary European Search Report dated Apr. 4, 2024 in European Application No. 21903879.1.

\* cited by examiner (a)

(b)

(c)

SENSOR DRIVING DEVICE INCLUDING SMA WIRES

CROSS-REFERENCE TO RELATED APPLICATIONS

This application is the U.S. national stage application of International Patent Application No. PCT/KR2021/018684, filed Dec. 9, 2021, which claims the benefit under 35 U.S.C. § 119 of Korean Application No. 10-2020-0171220, filed Dec. 9, 2020, the disclosures of each of which are incorporated herein by reference in their entirety.

TECHNICAL FIELD

An embodiment relates to a sensor driving device, and more particularly, to a sensor driving device capable of relative movement with respect to a lens barrel.

BACKGROUND ART

In general, a camera device is mounted on an automobile, an endoscope, and an electronic device such as a CCTV, in addition to a portable device such as a mobile communication terminal and an MP3 player. Such a camera device has been gradually developed with a focus on high pixels, and has been reduced in size and thickness. Not only that, current camera devices are changing so that a variety of additional functions can be realized at low production costs.

The above-described camera device includes a lens barrel for accommodating a lens, a lens holder coupled with the lens barrel, an image sensor disposed in the lens holder, and a driving substrate on which the image sensor is mounted. In this case, the lens transmits an image signal of a subject to the image sensor. Then, the image sensor converts the video signal into an electric signal.

Here, accuracy of the video signal at the camera device is determined according to a focal length defined as a distance between the lens and the image sensor.

Accordingly, the camera device provided focus correction or shake compensation by moving the lens barrel relative to the image sensor. That is, in the camera device, the lens barrel accommodating the lens was moved relative to the image sensor in an X-axis, a Y-axis, and a Z-axis. At this time, the camera device required at least six elastic members such as springs to relatively move the lens barrel. In addition, each elastic member was coupled with the lens barrel by a method like bonding.

However, the camera device according to the related art as described above is composed of an upper spring plate disposed above the lens barrel, a lower spring plate disposed below the lens barrel, and a structure such as an elastic wire for fixing the Z-axis due to relative movement of the lens barrel, and thus there is a problem that the module structure of the camera device is complicated.

In addition, the camera device according to the related art requires a plurality of elastic members for moving the lens barrel, and thus there is a problem that the number of assembly processes for the plurality of elastic members increases.

DISCLOSURE

Technical Problem

The embodiment provides a sensor driving device having a new structure.

In addition, the embodiment provides a sensor driving device that allows the image sensor to move relative to the lens barrel.

In addition, the embodiment provides a sensor driving device capable of not only movement of the X-axis, Y-axis, and Z-axis, but also tilt correction.

In addition, the embodiment provides a substrate capable of simplifying a spring structure for providing an auto focus function or a handshake compensation function, a sensor driving device, and a camera module including the same.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A sensor driving device according to an embodiment includes a fixed part including a first substrate on which a first lead pattern part and a first pad are formed; a moving part spaced apart from the fixed part and including a sensor; and a wire part disposed between the moving part and the fixed part, wherein the wire part includes a first wire part of a shape memory alloy having both ends connected to the first pad and moving the moving part with respect to the fixed part; and a second wire part having one end connected to the first lead pattern part and the other end connected to the moving part to elastically support the moving part.

In addition, the moving part includes a second substrate on which the sensor is disposed, and wherein the second substrate includes a hinge part to which the first wire part is coupled.

In addition, the first wire part includes a plurality of wires, and wherein the hinge part includes a plurality of hinges corresponding to a number of the plurality of wires of the first wire part.

In addition, an upper surface of the second substrate includes: a plurality of first regions corresponding to corner regions; a plurality of second regions between the plurality of first regions; and wherein the hinge part includes: a first hinge part disposed on the first region, and a second hinge part disposed on the second region.

In addition, the first wire part includes a first group-first wire part coupled to the first hinge part; and a second group-second wire part coupled to the second hinge part.

In addition, the first group-first wire part rotates the second substrate on which the sensor is disposed, with respect to an optical axis, and wherein the second group-second wire part moves the second substrate on which the sensor is disposed in a direction perpendicular to the optical axis.

In addition, the moving part includes a third substrate connected to the second substrate, and wherein the third substrate includes an opening in which the second substrate is disposed.

In addition, the third substrate includes a second lead pattern part, and wherein the other end of the second wire part is connected to one end of the second lead pattern part.

In addition, the second substrate includes a second pad, and wherein the other end of the second lead pattern part is connected to the second pad.

In addition, the second wire part electrically connects the first substrate and the second substrate.

In addition, the second wire part transmits an image signal acquired through the sensor part to the first substrate.

In addition, the second lead pattern part includes: a body part; a coupling part coupled to the other end of the second wire part; and a connecting part connecting the body part and the coupling part.

In addition, the first lead pattern part includes a plurality of first lead patterns, wherein the second lead pattern part includes a plurality of second lead patterns, wherein the second wire part includes a plurality of second wires, and wherein a number of the plurality of second wires is equal to or less than a number each of the plurality of first lead patterns and the plurality of second lead patterns.

In addition, the third substrate includes an insulating layer on which the second lead pattern part is disposed, and wherein one end of the second lead pattern part connected to the second wire part and the other end of the second lead pattern part connected to the second pad do not overlap the insulating layer in an optical axis direction.

In addition, the connecting part of the second lead pattern part includes a bending region.

In addition, the sensor driving device further comprises a holder disposed between the second substrate and the third substrate; and wherein the holder has a hole through which the second wire part passes.

Advantageous Effects

According to an embodiment, in order to implement the OIS and AF functions of the camera module, the image sensor is moved relative to the lens barrel in the X-axis, Y-axis and Z-axis directions instead of moving the lens barrel in the prior art. Accordingly, the camera module according to the embodiment can eliminate the complex spring structure for implementing the OIS and AF functions, and accordingly, the structure may be simplified. In addition, by moving the image sensor according to the embodiment relative to the lens barrel, it is possible to form a stable structure compared to the prior art.

In addition, according to an embodiment, the second substrate to which the image sensor is attached is relatively moved with respect to the first substrate by using a wire made of a shape memory alloy. According to this, in the embodiment, it is possible to remove components such as a magnet or a coil necessary for the OIS operation, and accordingly, the product cost can be reduced. In addition, according to an embodiment, the overall thickness of the camera module may be slimmed by removing the above components. In addition, according to the embodiment, the driving part for the OIS operation uses a shape memory alloy wire, and accordingly, magnetic field interference with the AF module can be completely resolved.

In addition, according to an embodiment, the terminal part electrically connected to the image sensor has a spring structure and is floated and disposed in a position that does not overlap in the vertical direction with the insulating layer. Accordingly, the camera module may move the image sensor with respect to the lens barrel while stably elastically supporting the image sensor.

According to the above embodiment, the X-axis direction shift, Y-axis direction shift, and Z-axis rotation corresponding to hand shake may be performed with respect to the image sensor, and hand shake correction of the lens corresponding to the hand shake compensation of the image sensor may be performed together, and through this, it is possible to provide a more improved image stabilization function.

DESCRIPTION OF DRAWINGS

FIG. 6 (b) is a plan view of a first actuator of FIG. 5.

FIG. 6 (c) is a bottom view of a first actuator of FIG. 5.

MODES OF THE INVENTION

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art. Further, the terms used in the embodiments of the present invention are for describing the embodiments and are not intended to limit the present invention.

In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (a), and (b) may be used.

These terms are only used to distinguish the elements from other elements, and the terms are not limited to the essence, order, or order of the elements. In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

Hereinafter, embodiments of the present disclosure will be described in detail with reference to the accompanying drawings.

Figure 1:
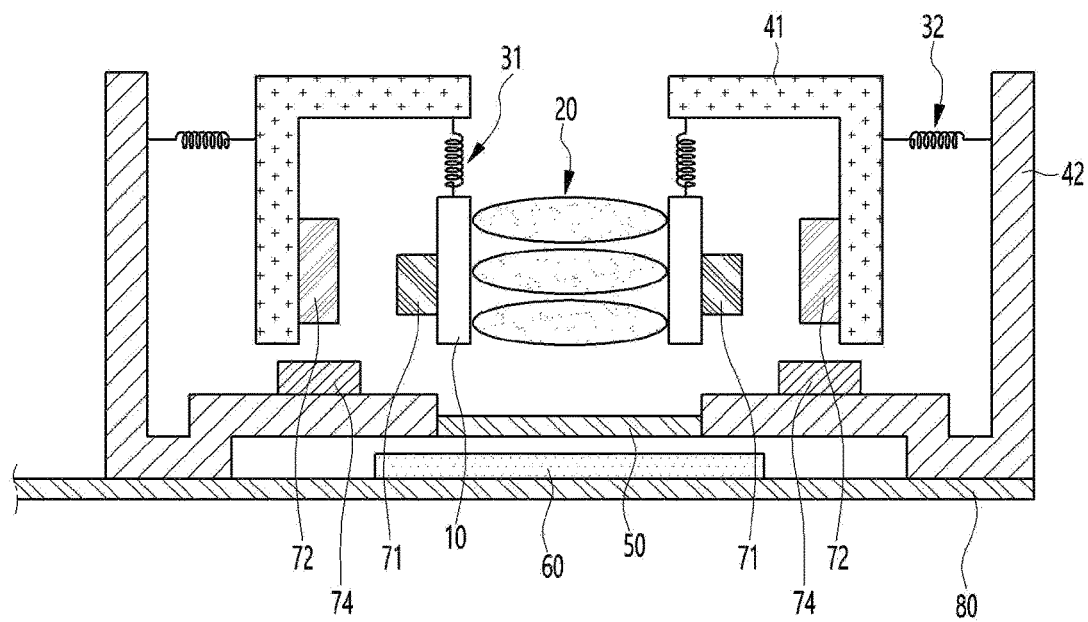
FIG. 1 is a view showing a camera module according to a comparative example.

FIG. 1 is a view showing a camera module according to a comparative example.

A camera module having an optical image stabilizer (OIS) function and an Auto Focusing (AF) function requires at least two spring plates.

The camera module according to the comparative example may have two spring plates. The camera module according to the comparative example requires an elastic member such as at least six springs for the spring plate.

Referring to FIG. 1, the camera module according to the comparative example includes an optical system including a lens assembly, an infrared cut-off filter, and a sensor unit. That is, the camera module according to the comparative example includes a lens barrel 10, a lens assembly 20, a first elastic member 31, a second elastic member 32, a first housing 41, a housing 42, an infrared cut-off filter 50, a sensor unit 60, a circuit board 80, and drivers 71, 72, 73, and 74.

In this case, the lens barrel 10 is connected to the first housing 41. That is, the lens barrel 10 is connected to the first housing 41 via the first elastic member 31. That is, the lens barrel 10 is connected to the first housing 41 so as to be movable by the first elastic member 31. In this case, the first elastic member 31 includes a plurality of springs (not shown). For example, the first elastic member 31 connects between the lens barrel 10 and the first housing 41 at a plurality of points of the lens barrel 10.

The second elastic member 32 is connected to the first housing 41 and the second housing 42 accommodating the first housing 41. The second elastic member 32 fixes the first housing 41 to the second housing 42 so as to be movable. The second elastic member 32 includes a plurality of springs. In detail, the second elastic member 32 includes a plate-shaped spring.

In this case, the first elastic member 31 moves the lens barrel 10 relative to the sensor unit 60 in a vertical direction (a Z-axis direction) while supporting the lens barrel 10. To this end, the first elastic member 31 includes at least four springs.

In addition, the second elastic member 32 moves the lens barrel 10 relative to the sensor unit 60 in a horizontal direction (an X-axis direction and a Y-axis direction) while supporting the lens barrel 10. To this end, the second elastic member 32 includes at least two springs.

As described above, in the camera module according to the comparative example, OIS and AF are performed as the lens barrel 10 moves in the X-axis, Y-axis, and Z-axis directions. To this end, the camera module according to the comparative example requires at least six elastic members such as springs. In addition, the camera module according to the comparative example requires two spring plates for supporting the elastic member as described above. Further, the camera module according to the comparative example requires an additional member such as an elastic wire for fixing the Z-axis of the lens barrel 10. Therefore, the camera module according to the comparative example has a complicated spring structure for moving the lens barrel in the X-axis, Y-axis and Z-axis directions.

In addition, in the camera module according to the comparative example, it is necessary to manually perform an operation of bonding the respective elastic members in order to couple the elastic member with the lens barrel 10. Accordingly, the camera module according to the comparative example has a complicated manufacturing process and requires a long manufacturing time.

In addition, the camera module according to the comparative example provides a tilt function of the lens barrel 10, but has a structure in which tilt correction of an image is substantially difficult. That is, even though the lens barrel 10 rotates with respect to the sensor unit 60, an image incident on the sensor unit 60 does not change, and thus the tilt correction of the image is difficult, and further, the tilt function itself is unnecessary.

Hereinafter, a substrate for an image sensor, a camera module, and a camera device including the same according to an embodiment will be described.

An 'optical axis direction' used below is defined as an optical axis direction of a lens and/or an image sensor coupled to a lens driving device.

A 'vertical direction' used below may be a direction parallel to the optical axis direction. The vertical direction may correspond to a 'z-axis direction'. A 'horizontal direction' used below may be a direction perpendicular to the vertical direction. That is, the horizontal direction may be a direction perpendicular to the optical axis. Accordingly, the horizontal direction may include a 'x-axis direction' and a 'y-axis direction'.

An 'autofocus function' used below adjusts the distance from the image sensor by moving the lens in the optical axis direction according to the distance of the subject so that a clear image of the subject can be obtained by the image sensor, and accordingly, it is defined as a function that automatically focuses on the subject.

Meanwhile, 'auto focus' may correspond to 'AF (Auto Focus)'.

The 'shake correction function' used below is defined as a function of moving a lens and/or an image sensor to offset vibration (movement) generated in the image sensor by an external force. Meanwhile, 'hand shake correction' may correspond to 'OIS (Optical Image Stabilization)'.

Figure 2:
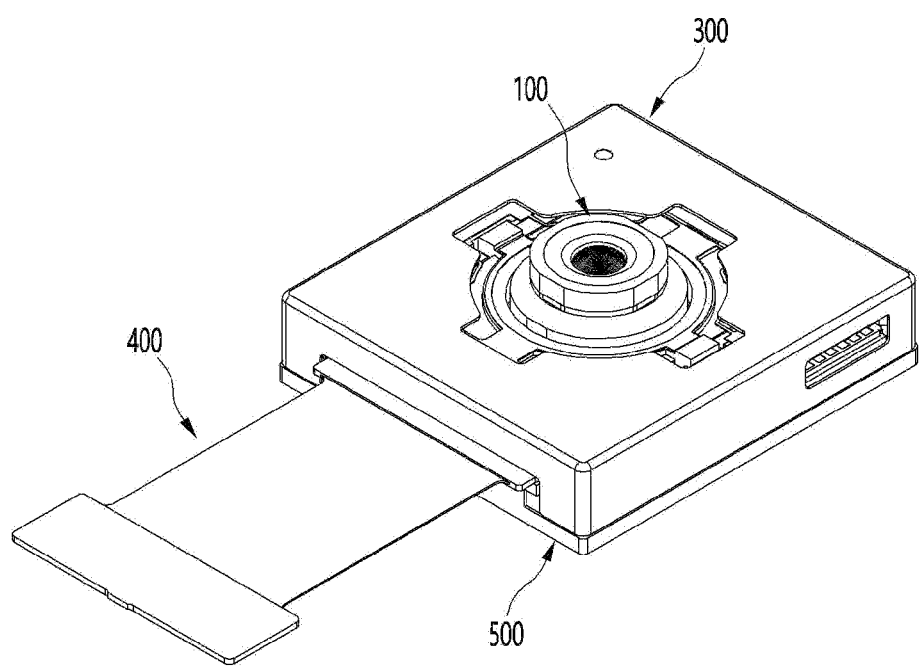
FIG. 2 is a perspective view of a camera device according to a present embodiment.
Figure 3:
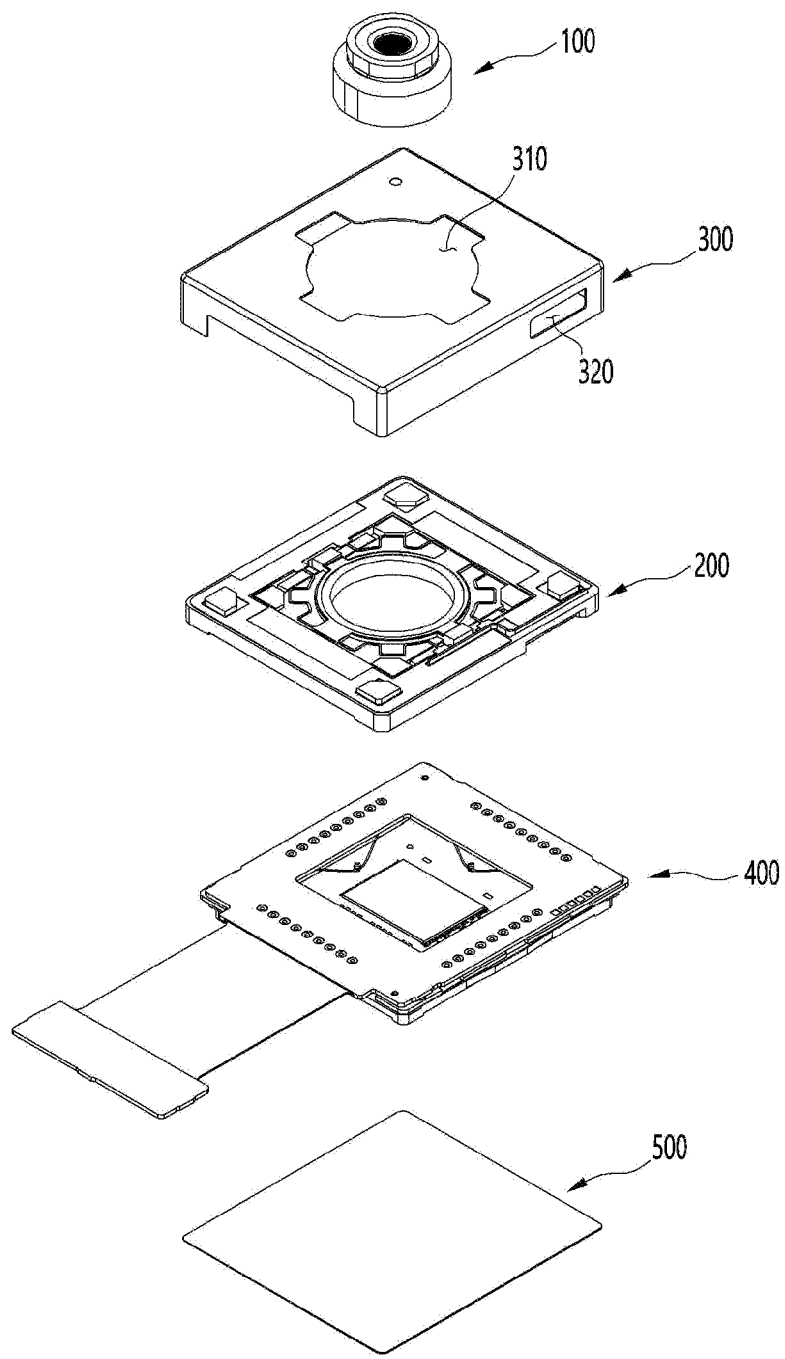
FIG. 3 is a cross-sectional view taken along line A-A of FIG. 2.
Figure 4:
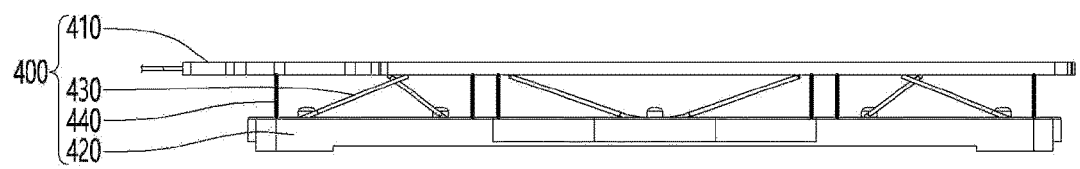
FIG. 4 is an exploded perspective view of a camera device according to the present embodiment.

FIG. 2 is a perspective view of a camera device according to a present embodiment, FIG. 3 is a cross-sectional view taken along line A-A of FIG. 2, and FIG. 4 is an exploded perspective view of a camera device according to the present embodiment.

A camera device in the embodiment may include a camera module. The camera device may include a lens driving device. Here, the lens driving device may be a voice coil motor (VCM, Voice Coil Motor). The lens driving device may be a lens driving motor. The lens driving device may be a lens driving actuator. The lens driving device may include an AF module. The lens driving device may include an OIS module.

<Camera Device>

The camera device may include the lens module 100.

The lens module 100 may include a lens and a lens barrel. The lens module 100 may include one or more lenses and a lens barrel capable of receiving one or more lenses. However, one configuration of the lens module 100 is not limited to the lens barrel, and any holder structure capable of supporting one or more lenses may be used. The lens module 100 may be movably coupled to the first actuator 200. The lens module 100 may be coupled to the inside of the first actuator 200 as an example. Accordingly, the lens module 100 may move from inside the first actuator 200 in response to the movement of the first actuator 200. The lens module 100 may be screw-coupled to the first actuator 200. As an example, the lens module 100 may be coupled to the first actuator 200 by an adhesive (not shown). Meanwhile, a light passing through the lens module 100 may be irradiated to an image sensor. Meanwhile, the lens module 100 may include, for example, five lenses.

The camera device may include an actuator.

Specifically, the camera device may include a first actuator 200 for shifting the lens module 100. The first actuator 200 may be an AF module. The first actuator 200 may move the lens module 100 in an up-down direction (clearly, an optical axis direction). That is, the first actuator 200 may perform an autofocus function by moving the lens module 100 in the optical axis direction.

The second actuator 400 may drive the image sensor 422. The second actuator 400 may tilt or rotate the image sensor 422. The second actuator 400 may move the image sensor 422. The second actuator 400 may move the image sensor 422 in a first direction perpendicular to the optical axis, move the image sensor 422 in a second direction perpendicular to the optical axis and the first direction, and rotate the image sensor 422 with respect to the optical axis. In this case, the first direction may be an x-axis direction, the second direction may be a y-axis direction, and the optical axis may be a z-axis direction.

Meanwhile, the first actuator 200 and the second actuator 400 may include a driving part to respectively move the lens module 100 and the image sensor 422. That is, the first actuator 200 may include a first driving part (to be described later). Also, the second actuator 400 may include a second driving part (to be described later). The first and second driving parts may have different configurations. For example, the first driving part may include a coil and a magnet. Alternatively, the second driving part may include a wire of a shape memory alloy.

In addition, the first driving part may drive the lens module 100 by generating an electromagnetic force between the coil and the magnet. In addition, the second driving part may drive the image sensor 422 by using the characteristics of the wire of the shape memory alloy.

The camera device may include a case.

The case may include a first case 300 and a second case 500. The first case 300 may be an upper case that covers an upper region of the camera device. In this case, the first case 300 may be a shield can.

The first case 300 may be disposed to surround side portions of the first actuator 200 and the second actuator 400 constituting the camera device. The first case 300 may have a first open region 310 formed on its upper surface. The first open region 310 of the first case 300 may be a hollow hole. The lens module 100 coupled to the first actuator 200 may be disposed in the first open region 310 of the first case 300. In this case, the first open region 310 of the first case 300 may have a larger diameter than that of the lens module 100.

Specifically, the first case 300 may include an upper plate and a plurality of side plates that are curved or bent at the edge of the upper plate and extend downward. For example, the upper plate of the first case 300 may have a rectangular shape, and thus may include four side plates extending downward from four edges of the upper plate. For example, the first case 300 may have a rectangular parallelepiped shape in which having the first region 310 in which the lens module 100 is inserted is formed on the upper surface thereof, the lower surface is open, and the corners are rounded.

Meanwhile, a second open region 320 may be formed on any one of the four side plates of the first case 300. The second open region 320 may be an exposure hole for exposing a part of the first actuator 200 disposed in the first case 300 to an outside. For example, the second open region 320 of the first case 300 may expose a terminal 262 of a flexible printed circuit board 260 of the first actuator 200. The second open region 320 may be an opening for soldering performed for coupling the terminal of the flexible circuit board 260 and a first substrate of a second actuator to be described later.

The second case 500 may be a lower case that covers a lower region of the camera device. The second case 500 may close an open lower region of the first case 300.

The first actuator 200 and the second actuator 400 constituting the camera device may be disposed in a receiving space formed by the first case 300 and the second case 500.

The image sensor 422 may be coupled to a second substrate (described later) constituting the second actuator 400. Preferably, the second actuator 400 may include a fixed part 410 and a moving part 420. In addition, the moving part of the second actuator 400 may be connected to the fixed part 410 through the first wire part 430 and the second wire part 440. In this case, the first wire part 430 is a shape memory alloy wire as described above. The first wire part 430 may be a driving wire of the image sensor 422. That is, the first wire part 430 may be a wire for tilting the image sensor 422. The second wire part 440 may be a signal transmission wire. Preferably, the second wire part 440 may be a connection wire electrically connected to the image sensor 422. More preferably, one end of the second wire part 440 may be connected to the substrate included in the fixed part 410, and the other end may be connected to the substrate included in the moving part 420 while elastically supporting the moving part 420 with respect to the fixed part 410. Also, the second wire part 440 may transmit a signal to the image sensor 422 constituting the moving part 420. Also, the second wire part 440 may transmit a signal obtained from the image sensor 422 to a substrate constituting the fixed part 410. This will be described in more detail below.

The moving part 420 of the second actuator 400 may move relative to the fixed part by a driving force provided through the first wire part 430. Here, the movement of the moving part 420 may include all of the movement in the first direction of the fixed part 410, the movement in the second direction, and the movement or rotation in the optical axis direction.

In addition, the image sensor 422 may be any one of a charge coupled device (CCD), a metal oxide semi-conductor (MOS), a CPD, and a CID.

In this embodiment, the image sensor 422 may be rotated with respect to the x-axis, the y-axis, and the z-axis. The image sensor 422 may move with respect to an x-axis, a y-axis, and a z-axis. The image sensor 422 may be tilted with respect to an x-axis, a y-axis, and a z-axis.

That is, the image sensor 422 is coupled to the moving part 420 of the second actuator 400, and when the moving part of the second actuator 400 moves relative to the fixed part of the second actuator 400, it may move relative to the fixed part of the second actuator 400 together with the moving part of the second actuator 400. As a result, the hand-shake correction function may be performed.

The camera device according to the present embodiment performs a handshake correction function and/or an autofocus function by moving the image sensor module 400 relative to the lens module 100.

That is, in recent years, as camera technology is developed, the image resolution is increasing, and accordingly, the size of the image sensor 422 is also increasing. In this case, as the size of the image sensor 422 increases, the size of the lens module 100 and the components of the actuator for shifting the lens module 100 also increase. For this reason, as the weight of other actuator components for shifting the lens module 100 increases as well as the own weight of the lens module 100, it is difficult to stably shift the lens module 100 using the existing VCM technology, and there are also many problems in terms of reliability.

Accordingly, in the present embodiment, AF is performed using the first actuator 200 implementing the lens shift method, and OIS is performed using the second actuator 400 implementing the image sensor shift method, and accordingly, it is possible to improve the reliability of the camera device.

Furthermore, there is a 5-axis hand shake in the hand shake in the camera device. For example, the 5-axis hand shake includes two hand shakes that vibrate at an angle, two hand shakes that shake with shift, and one hand shake that shakes with a rotation. In this case, only 4-axis handshake correction is possible with the lens shift method, and it is impossible to correct hand shake shaking due to rotation. For this, hand shake caused by rotation must be corrected by rotation of the optical module, even if the lens module 100 is rotated, the incident light path is maintained as it is, and accordingly, 5-axis hand shake is not possible with the lens shift method. Therefore, in this embodiment, the sensor shift method is applied to enable 5-axis handshake correction, and as described above, it is possible to solve the reliability problem of the lens shift method according to the development of camera technology.

Hereinafter, each component of the camera device according to the embodiment will be described in more detail.
<First Actuator>

Figure 5:
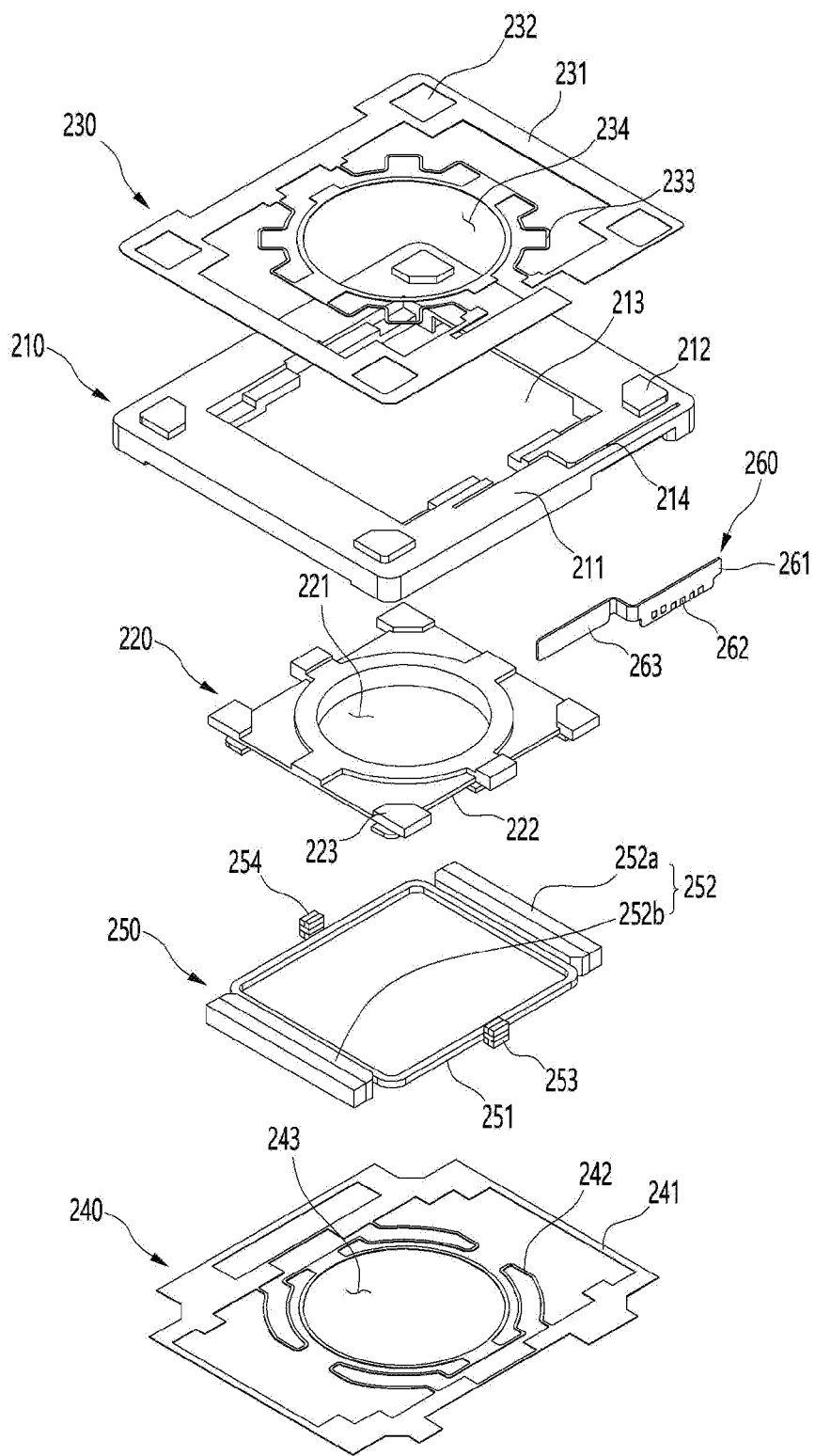
FIG. 5 is an exploded perspective view of a first actuator shown in FIG. 4.
Figure 6:
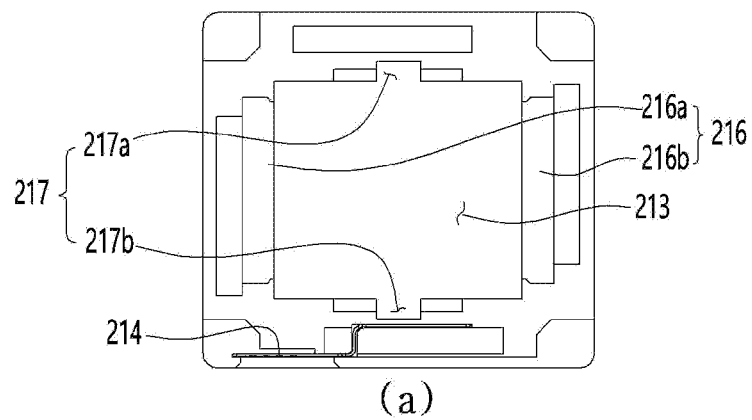
FIG. 6 (a) is a plan view of a base of FIG. 5.
Figure 6:
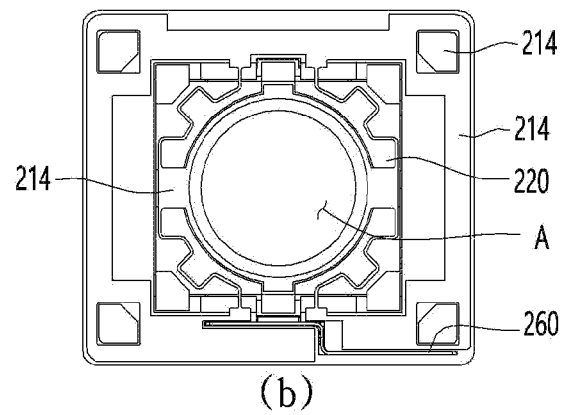
Figure 6:
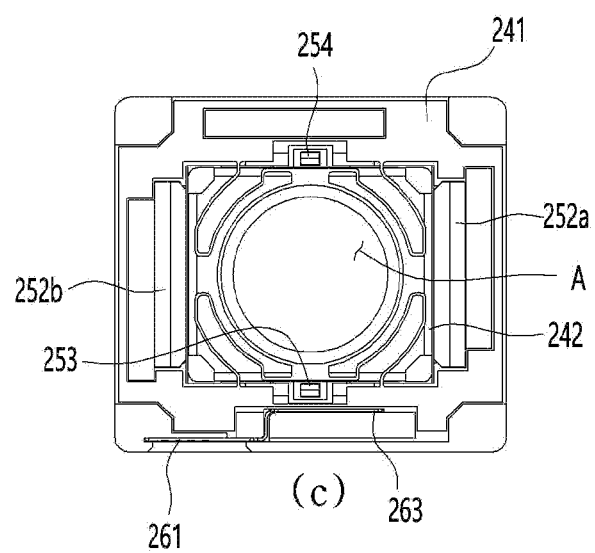

FIG. 5 is an exploded perspective view of a first actuator shown in FIG. 4, FIG. 6 (a) is a plan view of a base of FIG. 5, FIG. 6 (b) is a plan view of a first actuator of FIG. 5, and FIG. 6 (c) is a bottom view of a first actuator of FIG. 5.

Referring to FIGS. 5 and 6, the first actuator 200 may include a base 210, a bobbin 220, a first elastic member 230, a second elastic member 240, and a first driving part 250.

The bobbin 220 of the first actuator 200 in the embodiment is elastically supported in the vertical direction by the base 210 through the first elastic member 230 and the second elastic member 240, the bobbin 220 may move in the vertical direction by the electromagnetic interaction of the first driving part 250 disposed on the bobbin 220. Accordingly, the lens module 100 coupled to the bobbin 220 may move in the optical axis direction. And, as the lens module 100 moves in the optical axis direction, an auto focus (AF) function may be performed.

The base 210 may be a fixing member of the first actuator 200. The base 210 may be disposed inside the first case 300 and coupled to the first case 300.

The base 210 may include a body 211 having a first opening 213 formed in a center thereof. A shape of the body 211 may have a shape corresponding to the first case 300. For example, the shape of the body 211 of the base 210 may have a rectangular parallelepiped shape or a rectangular cross-sectional shape corresponding to the shape of the first case 300.

A plurality of first protrusions 212 are formed on the upper surface of the body 211 of the base 210. The plurality of first protrusions 212 may be formed to protrude upward from an upper surface of the body 211. In addition, a plurality of lower protrusions (not shown) that are formed to protrude in a lower direction may also be formed on a lower surface of the body 211 in response thereto. The plurality of first protrusions 212 may be fixing protrusions for fixing the first elastic member 230 disposed on the base 210. The plurality of first protrusions 212 may be disposed in each of four corner regions of the upper surface of the body 211 of the base 210.

A first opening 213 is formed in the body 211 of the base 210. The first opening 213 may have a shape corresponding to the shape of the bobbin 220. For example, the bobbin 220 may have a rectangular plate shape, and accordingly, the first opening 213 may also have a rectangular shape. However, the present invention is not limited thereto, and the bobbin 220 may have a cylindrical shape, and accordingly, the first opening 213 may also have a circular shape. A size of the first opening 213 may be larger than a size of the bobbin 220. For example, in a state in which the bobbin 220 is inserted into the first opening 213, a certain gap may exist between an inner surface of the body 211 of the base 210 and an outer surface of the bobbin 220.

A stepped portion 215 may be formed on the inner surface of the body 211 of the base 210. The stepped portion 215 may limit the movement of the bobbin 220 while selectively supporting the bobbin 220 disposed in the first opening 213. For example, the stepped portion 215 may function as a stopper for limiting movement of the bobbin 220 in the downward direction. That is, the bobbin 220 in a normal state does not contact the stepped portion 215 in the state disposed in the first opening 213, and when the bobbin 220 moves to the limit of movement in the downward direction, it may come into contact with the stepped portion 215.

Meanwhile, a first recess 217 recessed in an outward direction may be formed on an inner surface of the body 211 of the base 210. The first recess 217 may include a first-first recess 217a and a first-second recess 217b respectively formed on two inner surfaces facing each other among inner surfaces of the body 211. At least a portion of the bobbin 220 may be disposed in the first-first recess 217a and first-second recess 217b. For example, a sensor magnet mounting part (not shown) formed on the bobbin 220 may be disposed in the first-first recess 217a and the first-second recess 217b. The first-first recesses 217a and the first-second recesses 217b may be formed to minimize a gap between sensor magnets 253 and 254 mounted on the sensor magnet mounting part of the bobbin 220 and a driver IC (not shown) mounted on the flexible circuit board 260.

The first driving magnet mounting groove 216 is formed on the lower surface of the body 211 of the base 210, in a region facing each other with respect to the first opening 213. That is, a first-first driving magnet mounting groove 216a is formed in a first region of the lower surface of the base 210. And, a first-second driving magnet mounting groove 216b is formed in a second region facing the first region among the lower surfaces of the body 211 of the base 210. A first-first driving magnet 252b may dispose in the first-first driving magnet mounting groove 216a, and a first-second driving magnet 252a may dispose in the first-second driving magnet mounting groove 216b. In this case, the first actuator 200 in the embodiment moves the bobbin 220 in the optical axis direction using two driving magnets 252a and 252b disposed to face each other. At this time, in order to move the bobbin 220 in the optical axis direction only with the two first driving magnets 252a and 252b, the first driving magnets 252a and 252b may be disposed to extend in a longitudinal direction. In this case, the first driving magnets 252a and 252b may be disposed in a region other than a corner region of a lower surface of the body 211 in order to minimize an overlap region with the second driving magnet (described later) of the second actuator 400 in the optical axis direction. In addition, the first driving magnets 252a and 252b may have magnetic field interference with the second driving magnet of the second actuator 400. At this time, the first driving magnets 252a and 252b are disposed in a fixed state to the body 211 of the base 210. In addition, the second driving magnet of the second actuator 400 is also fixed to the fixed part rather than the moving part. As described above, in the embodiment, the first driving magnets 252a and 252b and the second driving magnet are respectively disposed at fixed positions. That is, in the embodiment, the coil is arranged in a portion moving according to the lens shift and the image sensor shift, and accordingly, the driving magnets are continuously positioned in a fixed position to minimize the mutual magnetic field interference.

Meanwhile, the body 211 of the base 210 includes a substrate groove 214 into which the flexible circuit board 260 is inserted. In this case, the flexible circuit board 260 may be inserted into the substrate groove 214 in a vertically erected state. In this case, the substrate groove 214 may have a bent shape that is bent at least once. That is, the flexible circuit board 260 is inserted into the substrate groove 214. In this case, the flexible circuit board 260 includes a driver IC disposed on one surface thereof. The driver IC may be a driver with a built-in Hall sensor. Accordingly, the driver IC detects a position of the lens module 100 by sensing a change in the intensity of the electric field that changes according to the positions of the sensor magnets 253 and 254, and thus may control an output signal.

In this case, the driver IC is disposed to face the sensor magnets 253 and 254. In this case, as a distance between the sensor magnets 253 and 254 and the driver IC is closer, the accuracy of the position sensing information of the bobbin 220 or the lens module 100 obtained through the driver IC may be improved. In addition, the flexible circuit board 260 includes a terminal 262 electrically connected to a first substrate (to be described later) of the second actuator 400. At this time, a process such as soldering should be performed for electrical connection between the terminal 262 and the first substrate. Accordingly, the terminal 262 should be positioned close to the outer surface of the base 210.

That is, the flexible circuit board 260 includes a first substrate region 261 in which the terminal 262 is disposed and a second substrate region 262 in which the driver IC is disposed. In the flexible circuit board 260, the first substrate region 261 is adjacent to the outer surface of the base 210, and the second substrate region 263 is adjacent to the inner surface of the base 210. and, for this purpose, a bending region may be included between the first and second substrate regions.

A bobbin 220 is disposed in the first opening 213 of the base 210.

A second opening 221 may be formed in the center of the bobbin 220. The second opening 221 may have a shape corresponding to the lens module 100. For example, the second opening 221 may have a circular shape corresponding to the shape of the lens module 100, but is not limited thereto. The bobbin 220 may be coupled to the lens module 100. For example, the lens module 100 may be inserted into the second opening 221 of the bobbin 220 to be coupled to the bobbin 220.

A plurality of second protrusions 223 in contact with the first elastic member 230 may be formed on the upper surface of the bobbin 220. The plurality of second protrusions 223 may be stoppers for limiting the upward movement range of the bobbin 220 while allowing the bobbin 220 to be elastically supported by the first elastic member 223. For example, when the bobbin 220 is out of the movement range in the upward direction, the second protrusion 223 comes into contact with the inner surface of the upper surface of the first case 300 positioned above the bobbin 220 and, the movement of the bobbin 220 may be limited.

A coil winding part 222 on which the first coil part 251 is wound may be formed on the outer surface of the bobbin 220. For example, the coil winding part 222 may be formed in the form of a recess recessed inwardly from the outer surface of the bobbin 220. In addition, the first coil part 251 may be wound around the coil winding part 222. The first coil part 251 may have a "coil block" shape. The first coil part 251 may be an "electromagnet". The first coil part 251 is disposed to face the first driving magnets 252a and 252b, and thus electromagnetically interacts with the first driving magnets 252a and 252b to generate electromagnetic force. In this case, the first coil part 251 may be electrically connected to the second elastic member 240. Accordingly, the first coil part 251 may receive current from the second elastic member 240 to generate electromagnetic force. As a result, the bobbin 220 may move in the optical axis direction to perform the AF function.

The sensor magnet mounting part (not shown) in which the sensor magnets 253 and 254 can be disposed may formed in the remaining outer surfaces except for the outer surfaces facing the first driving magnets 252a and 252b among the outer surfaces of the bobbin 220. The sensor magnet mounting part may protrude from the remaining outer surfaces toward the inner surface of the base 210. In addition, the sensor magnets 253 and 254 may be mounted on the sensor magnet mounting part and positioned in the first-first recess 217a and the first-second recess 217b of the base 210. The sensor magnets 253 and 254 move together with the bobbin 220 as the bobbin 220 moves. And, the magnitude of the magnetic field sensed by the driver IC disposed on the flexible circuit board 260 varies according to the positions of the sensor magnets 253 and 254, and the driver IC may detect the position of the sensor magnets 253 and 254, further the bobbin 220, and further the position of the lens module 100 based on the change in the magnitude of the changing magnetic field.

The first elastic member 230 is disposed above the base 210 and the bobbin 220. The second elastic member 240 is disposed below the base 210 and the bobbin 220. Accordingly, the bobbin 220 may be elastically supported in the vertical direction by the first elastic member 230 and the second elastic member 240 in the first opening of the base 210.

The first elastic member 230 may be a plate spring. The first elastic member 230 may be made of metal. Alternatively, the first elastic member 230 may be non-magnetic. Accordingly, the first elastic member 230 may not be affected by the magnetic force of the first driving magnets 252a and 252b and the electromagnetic force of the first coil part 251.

The first elastic member 230 may be disposed on the base 210. Also, the first elastic member 230 may be disposed on the bobbin 220. The first elastic member 230 may be coupled to the base 210 and the bobbin 220. That is, the first elastic member 230 includes a first-first elastic part 231 coupled to the base 210 and a first-second elastic part 233 extending from the first-first elastic part 231 and coupled to the bobbin 220. The first-first elastic part 232 may include a coupling groove 232 inserted into the plurality of first protrusions 212 disposed on the upper surface of the body 211 of the base 210. Accordingly, the first elastic member 230 may elastically support the upper side of the bobbin 220 while the coupling groove 232 is coupled to the first protrusion 212. In addition, the first elastic member 230 may include an opening 234 in the center of which the lens module 100 is inserted.

The second elastic member 240 may be disposed under the base 210. Also, the second elastic member 240 may be disposed under the bobbin 220. The second elastic member 240 may be coupled to the base 210 and the bobbin 220. That is, the second elastic member 240 may include a second-first elastic part 241 coupled to the base 210 and a second-second elastic part 242 coupled to the bobbin 220. Accordingly, the second elastic member 240 may elastically support the lower side of the bobbin 220 while being coupled to the base 210. In addition, the second elastic member 240 may include an opening 243 in the center into which the lens module 100 is inserted.

The second elastic member 240 may be electrically connected to the first coil part 251. The second elastic member 240 may be electrically connected to the flexible circuit board 260. The second elastic member 240 may electrically connect the first coil part 251 and the flexible circuit board 260. Accordingly, current may be supplied from the flexible circuit board 260 to the first coil part 251 through the second elastic member 240. In this case, direction, wavelength, intensity, etc. of the current supplied to the first coil part 251 may be controlled.

<Second Actuator>

Hereinafter, the second actuator 400 will be described.

The second actuator 400 may be positioned below the first actuator 200 and may operate independently of the first actuator 200 to shift the image sensor 422.

To this end, the second actuator 400 may include a fixed part 410 having a fixed position, and a moving part 420 whose position is moved by the driving force of the first wire part 430 in a state coupled to the fixed part.

Figure 7:
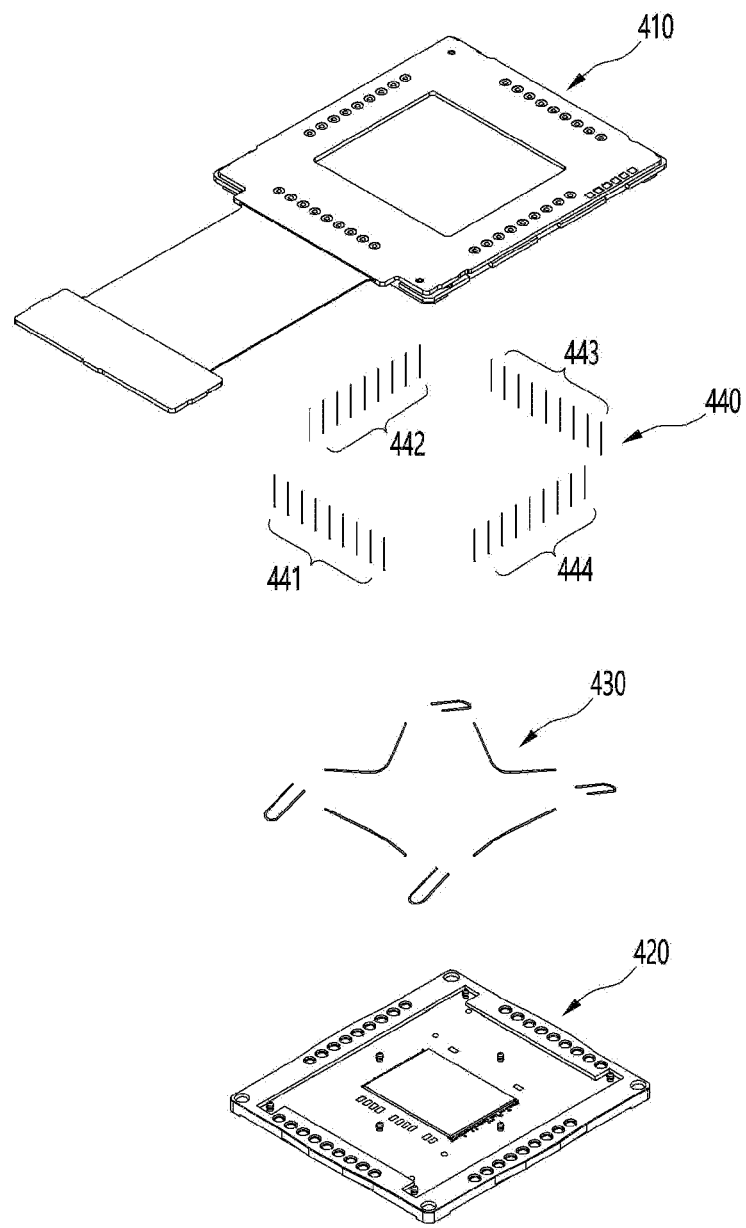
FIG. 7 is an exploded perspective view of a second actuator according to an embodiment.
Figure 8:
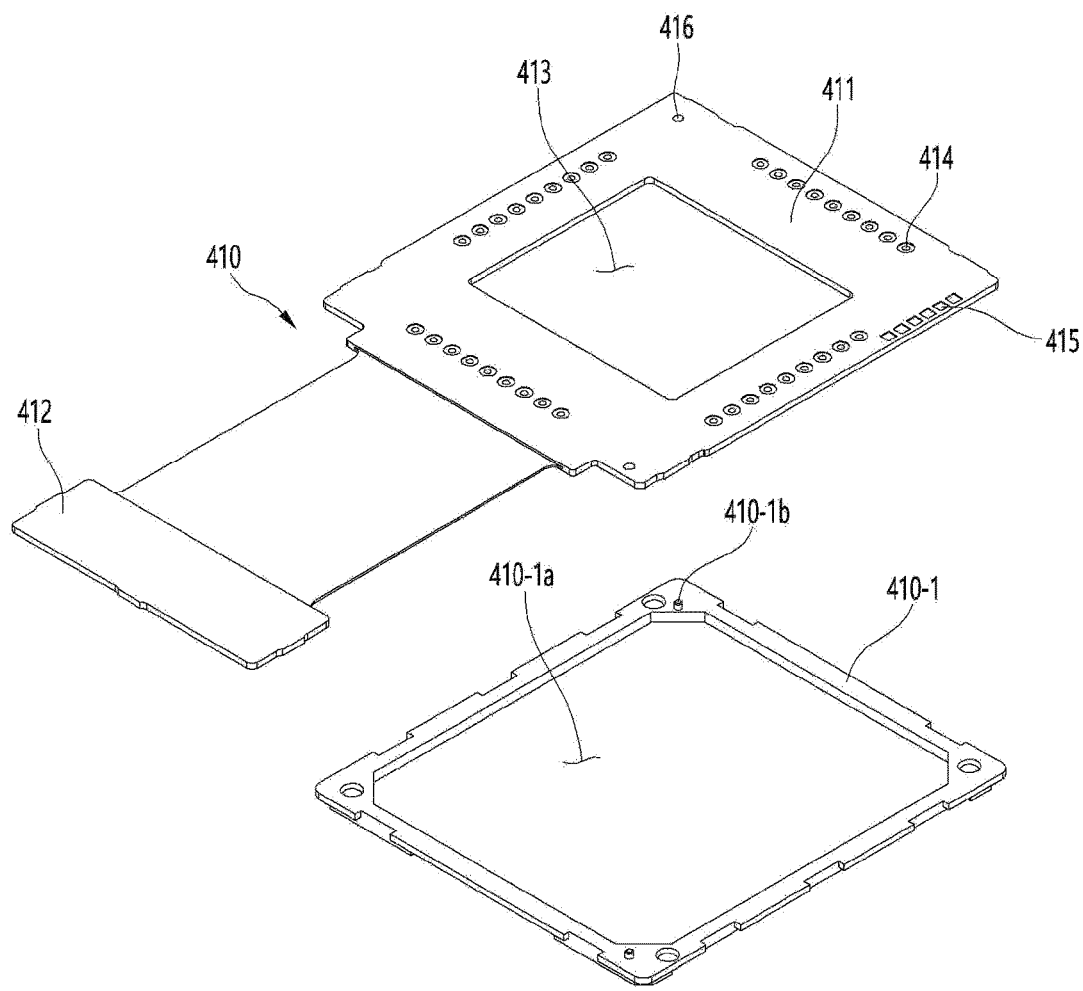
FIG. 8 is an exploded perspective view of a fixed part according to an embodiment.
Figure 9:
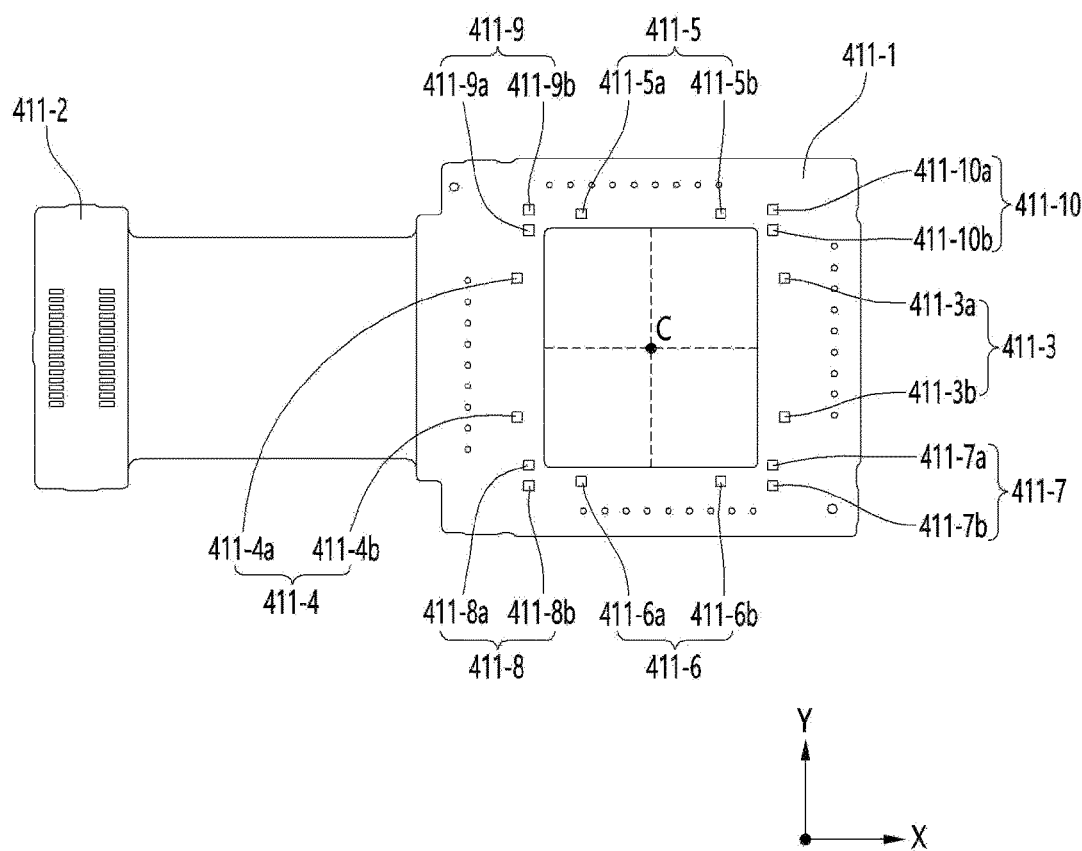
FIG. 9 is a plan view of a first substrate of FIG. 8.
Figure 10:
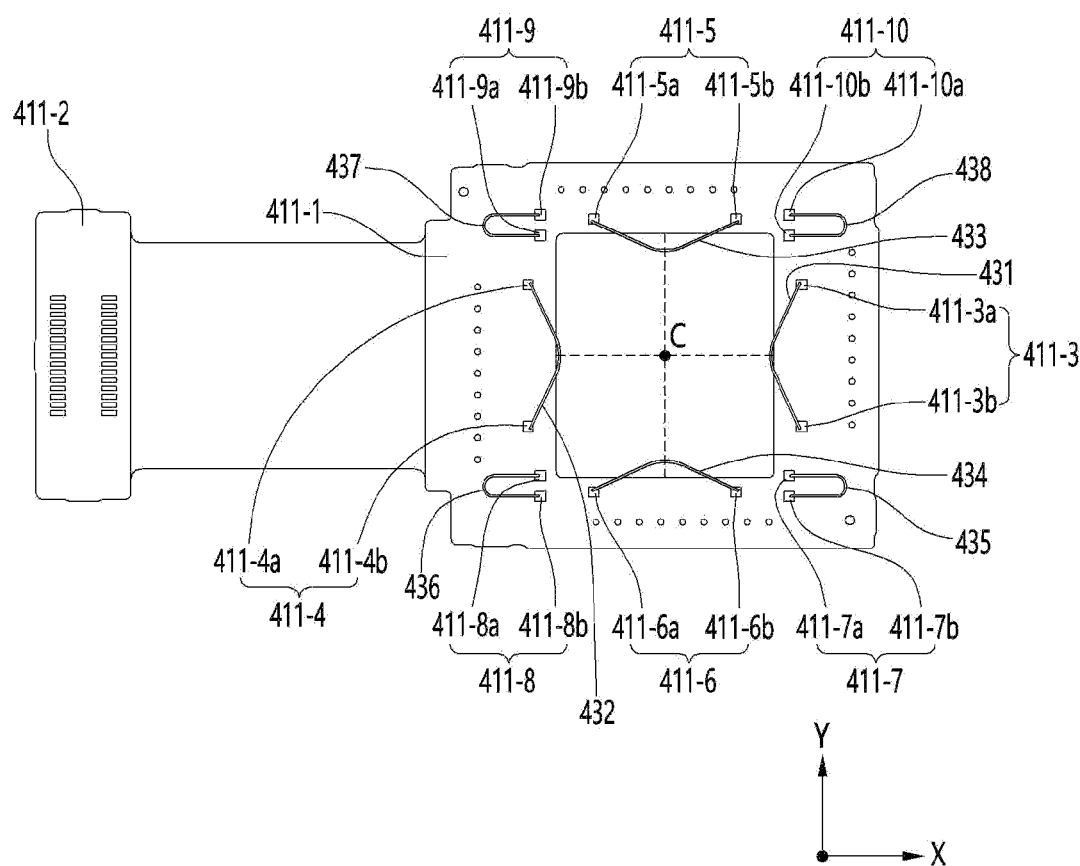
FIG. 10 is a coupling view of a first substrate and a first wire part of a shape memory alloy according to an embodiment.
Figure 11:
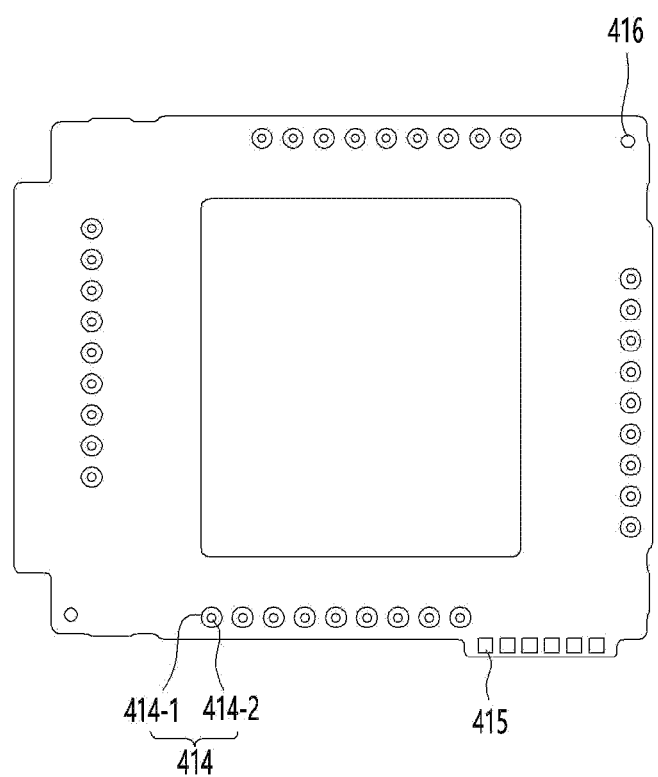
FIG. 11 is a detailed view of an upper surface of a first substrate.
Figure 12:
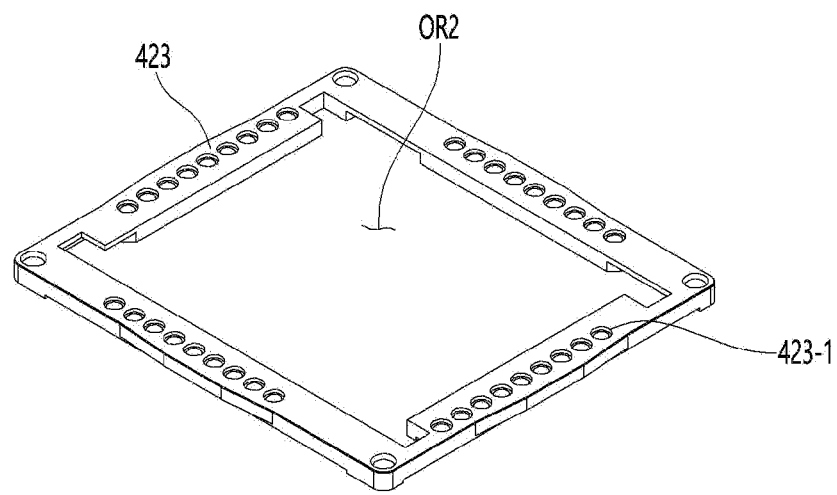
FIG. 12 is an exploded perspective view of a moving part according to an embodiment.
Figure 12:
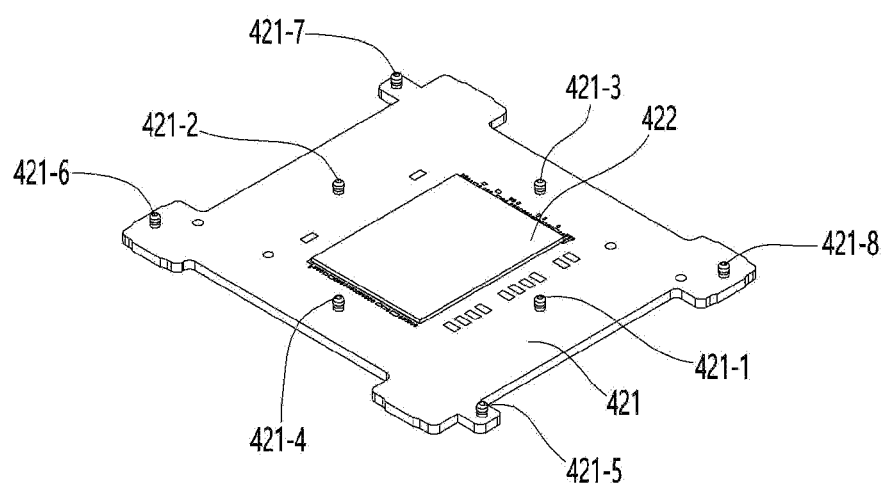
Figure 12:
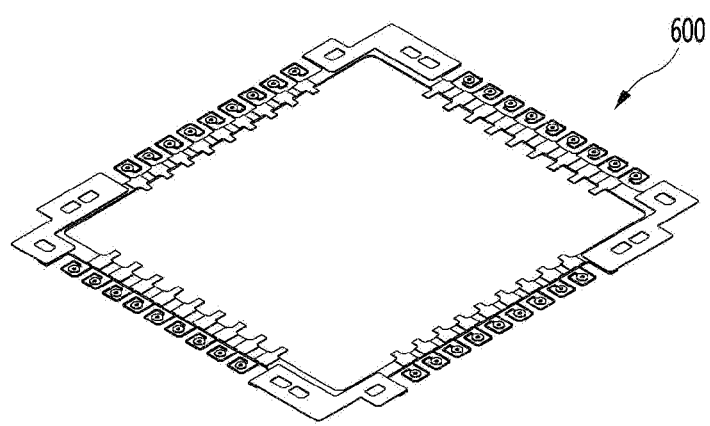
Figure 13:
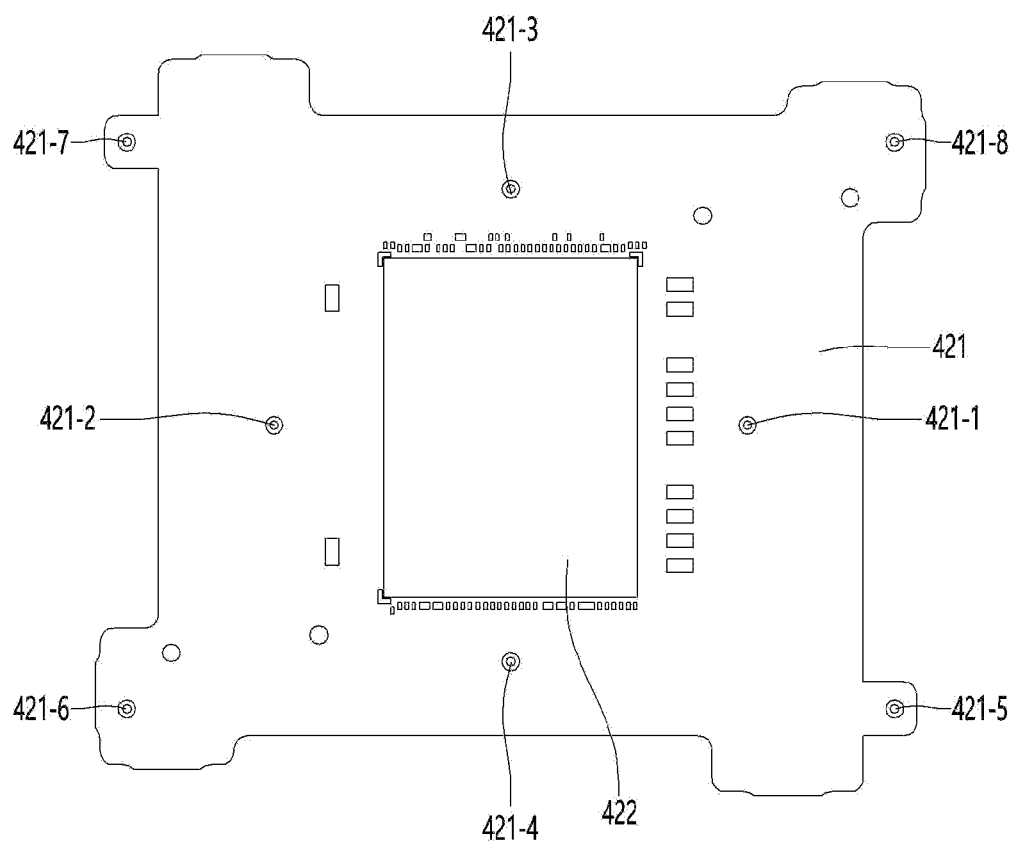
FIG. 13 is a plan view of a second substrate of FIG. 12.
Figure 14:
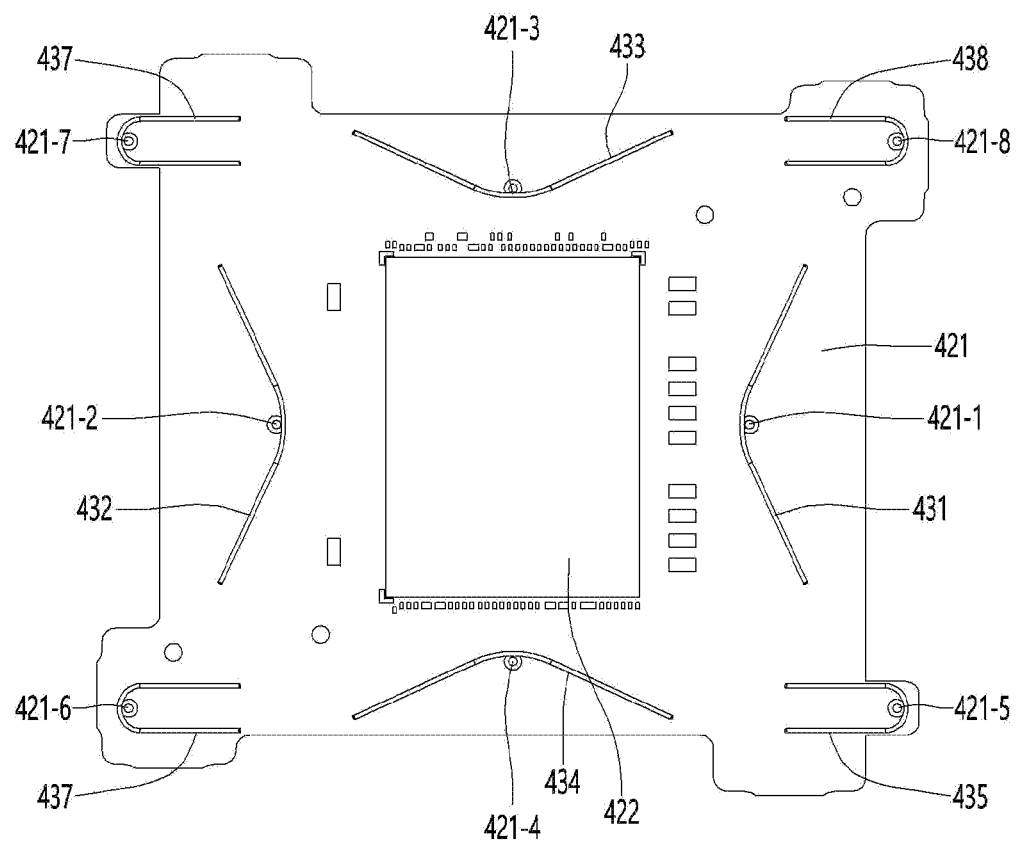
FIG. 14 is a coupling view of a second substrate and a wire of a shape memory alloy in the embodiment.
Figure 15:
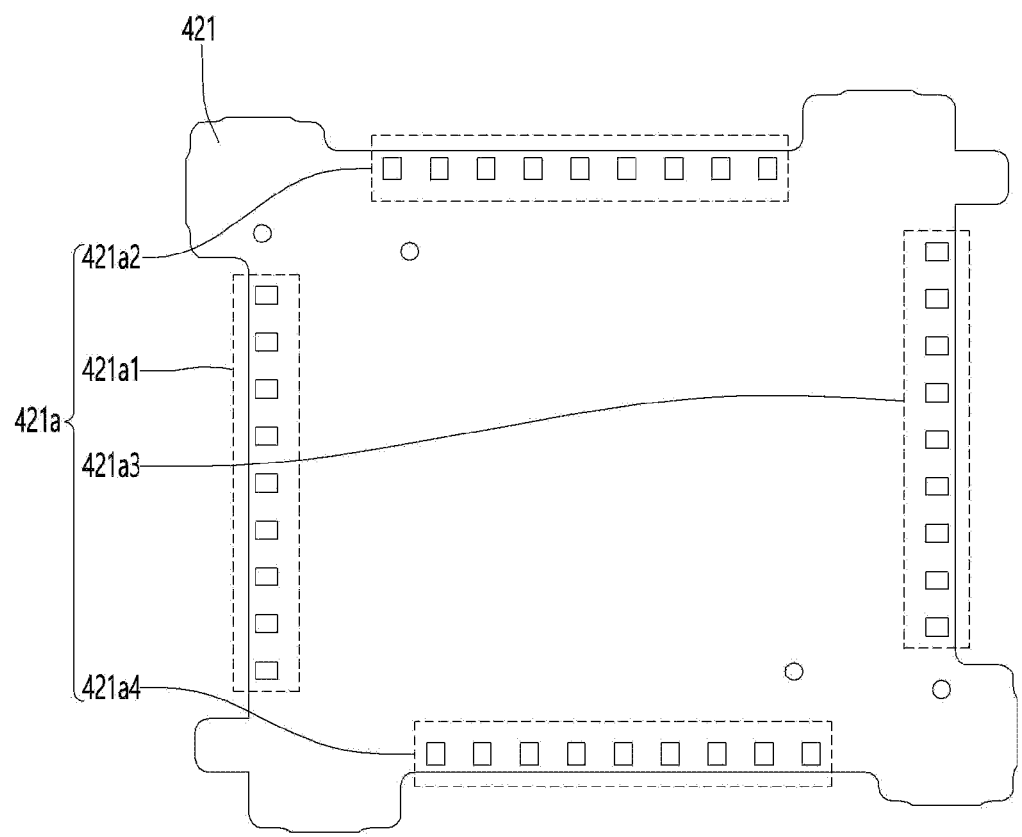
FIG. 15 is a bottom view of a second substrate in the embodiment.
Figure 16:
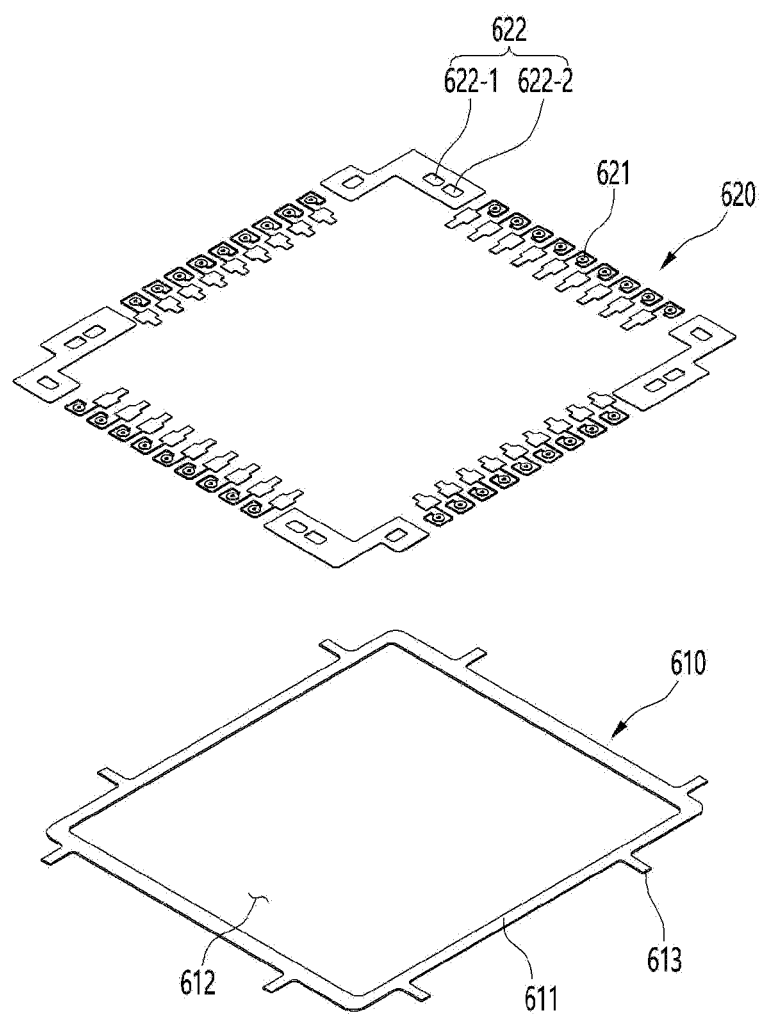
FIG. 16 is an exploded perspective view of a third substrate according to the embodiment.
Figure 17:
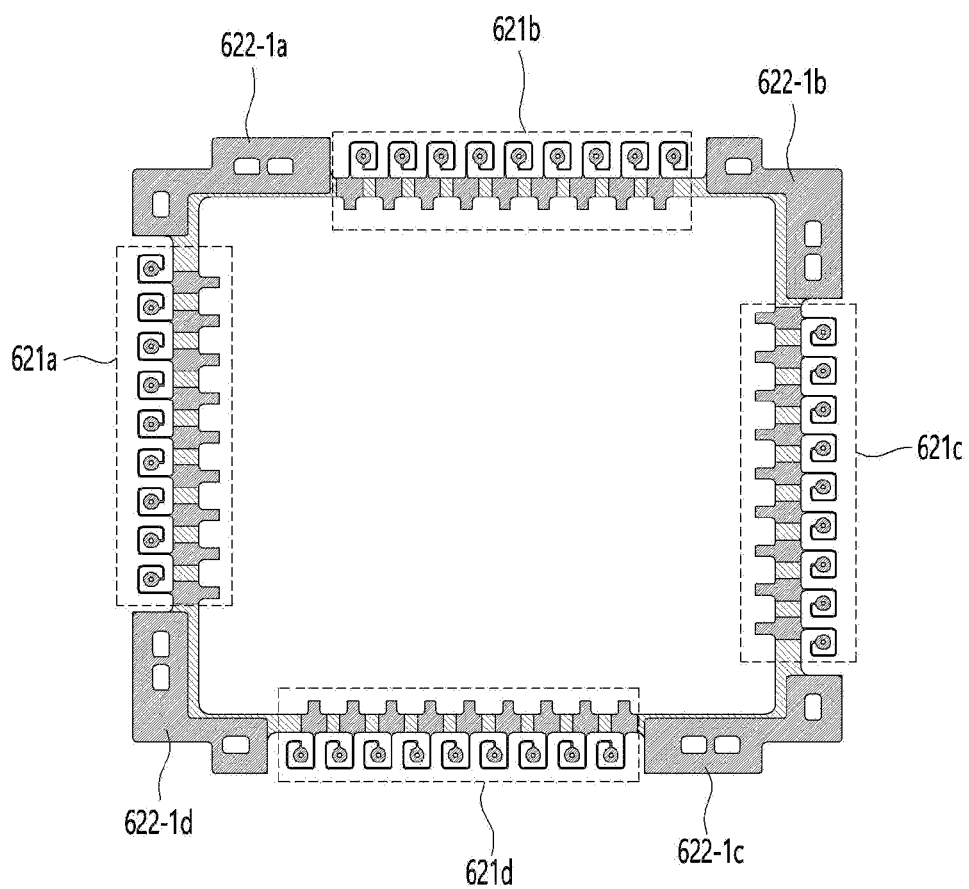
FIG. 17 is a plan view of a third substrate according to an embodiment.
Figure 18:
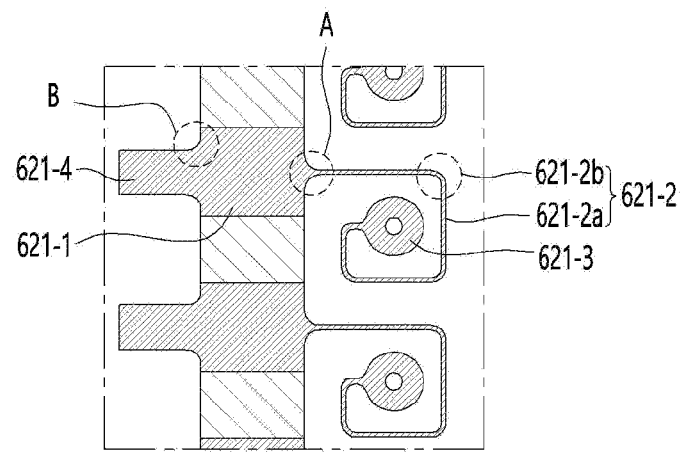
FIG. 18 is an enlarged view of a specific region of FIG. 17.
Figure 19:
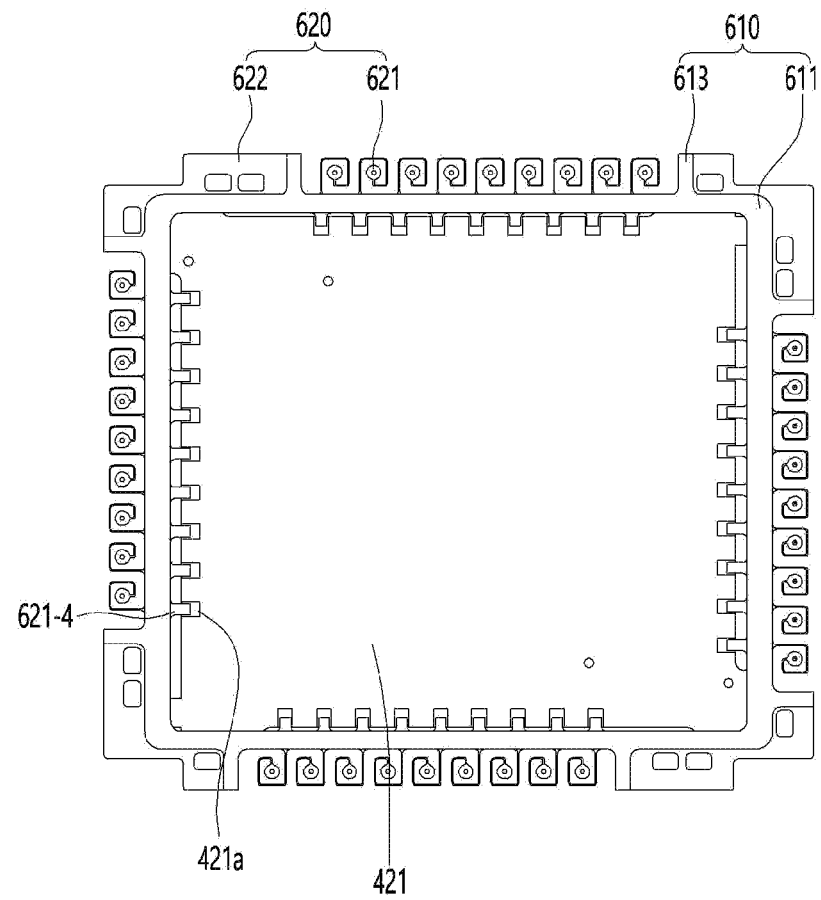
FIG. 19 is a coupling view of a second substrate and a third substrate.

FIG. 7 is an exploded perspective view of a second actuator according to an embodiment, FIG. 8 is an exploded perspective view of a fixed part according to an embodiment, FIG. 9 is a plan view of a first substrate of FIG. 8, FIG. 10 is a coupling view of a first substrate and a first wire part of a shape memory alloy according to an embodiment, FIG. 11 is a detailed view of an upper surface of a first substrate, FIG. 12 is an exploded perspective view of a moving part according to an embodiment, FIG. 13 is a plan view of a second substrate of FIG. 12, FIG. 14 is a coupling view of a second substrate and a wire of a shape memory alloy in the embodiment, FIG. 15 is a bottom view of a second substrate in the embodiment, FIG. 16 is an exploded perspective view of a third substrate according to the embodiment, FIG. 17 is a plan view of a third substrate according to an embodiment, FIG. 18 is an enlarged view of a specific region of FIG. 17, and FIG. 19 is a coupling view of a second substrate and a third substrate.

Referring to FIGS. 7 to 19, the second actuator 400 may include a fixed part 410, a moving part 420, a first wire part 430, and a second wire part 440. According to an embodiment, the second actuator 400 may further include a housing (not shown).

The fixed part 410 and the moving part 420 are electrically connected to each other by the second wire part 440. Here, a length of the second wire part 440 may be greater than the sum of a thickness of the fixed part 410 and a thickness of the moving part 420. Accordingly, the moving part 420 disposed under the fixed part 410 may be placed at a position spaced apart from the fixed part 410 by a predetermined interval.

That is, the moving part 420 is arranged in a state (flyed state) suspended from the fixed part 410 by the second wire part 440, and it can move relative to the fixed part 410 by a driving force generated by the first wire part 430, which will be described later.

The second wire part 440 may electrically connect a substrate constituting the fixed part 410 and a substrate constituting the moving part 420. The second wire part 440 may have elasticity. The second wire part 440 may be an elastic member. The second wire part 440 may be a wire spring. The second wire part 440 may electrically connect between a circuit pattern of the substrate of the fixed part 410 and a circuit pattern of the substrate of the moving part 420 in a state in which the fixed part 410 and the moving part 420 are spaced apart by a predetermined interval. The second wire part 440 may be formed of metal. The second wire part 440 may elastically support the moving part 420 with respect to the fixed part 410.

The second wire part 440 may include a plurality of second wires. The number of the plurality of second wires included in the second wire part 440 may correspond to the number of channels of signals exchanged between the fixed part 410 and the moving part 420. The second wire part 440 may include second wires disposed nine each on the side between the adjacent corners among four corners of the fixed part 410 and the moving part 420, and accordingly, a total of 36 second wires may be included. Here, the second wire part 430 may electrically connect the first substrate constituting the fixed part 410 and the third substrate 600 constituting the moving part 420. However, hereinafter, for convenience of description, it will be described that the second wire part 440 connects the fixed part 410 and the moving part 420.

The second wire part 440 includes nine second-first wires 441 disposed on a first side of each of the fixed part 410 and the moving part 420, and nine second-second wires 442 disposed on a second side, nine second-third wires 443 disposed on a third side, and nine second-fourth wires 444 disposed on a fourth side.

That is, the second wire part 440 may be evenly distributed on each of the four sides between the fixed part 410 and the moving part 420. That is, the second wire 440 may form a vertical symmetric structure with sides facing each other from four sides. At this time, the second wire part 440 must elastically support the moving part 420 with respect to the fixed part 410 while transmitting a signal. Here, when the second wire part 440 is asymmetrically disposed, the moving part 420 cannot perform a normal shift operation, and accordingly, a difference occurs in the amount of movement between the portion with a large number of the second wire part 440 and the portion other than this, and accordingly, a problem may occur in operation reliability. Therefore, in the embodiment, the second wire part 440 is uniformly disposed in each region in a circle, and accordingly, the reliability of the image sensor shift operation is improved.

Meanwhile, the fixed part 410 may be the first substrate 410. Accordingly, hereinafter, the fixed part 410 and the first substrate 410 will be described with the same reference numerals. In addition, the fixed part 410 may optionally further include a first holder 410-1 disposed under the first substrate 410.

A first open region 413 may be formed in the center of the first substrate 410. Also, the first holder 410-1 may include a second open region 410-1a formed in a region overlapping the first open region 413 in the optical axis direction. The first open region 413 and the second open region 410-1a may have the same size or different sizes. Also, the first open region 413 and the second open region 410-1a may have the same shape or different shapes. The first open region 413 and the second open region 410-1a may overlap each other in the optical axis direction. Preferably, the first open region 413 and the second open region 410-1a may overlap the image sensor 422 in the optical axis direction. The first open region 413 and the second open region 410-1a may overlap the image sensor 422 in the optical axis direction, so that light passing through the lens module may be transmitted to the image sensor 422.

The first holder 410-1 will be described, and the first holder 410-1 may be disposed under the first substrate 410. The first holder 410-1 may be disposed under the first substrate 410 to maintain a minimum separation distance between the first substrate 410 and the moving part 420. In addition, the first holder 410-1 may be disposed under the first substrate 410 to provide rigidity to the first substrate 410. For example, the first holder 410-1 may allow the first substrate 410 to maintain flatness.

The first holder 410-1 is not an essential component of the second actuator 400 in the embodiment, and may be optionally omitted.

The first substrate 410 will be described in detail, and the first substrate 410 includes a first substrate region 411 having a first opening 413 formed in the center thereof and a second substrate region 412 extending from the first substrate region 411 in which a connector connected to an external device is disposed.

The first substrate 410 may include a first lead pattern part 414 disposed in the first substrate region 411. The first substrate 410 may be coupled to the second wire part 440 in the first lead pattern part 414. That is, one end of the second wire part 440 may be coupled to the first lead pattern part 414 of the first substrate 410. The first lead pattern part 414 and the second wire part 440 may be coupled through soldering. The first lead pattern part 414 may be a part in which a solder resist is opened for electrical connection with the second wire part 440.

Specifically, the first lead pattern part 414 includes a first hole 414-2 and a first lead pattern 414-1 disposed around the first hole 414-2. That is, the first lead pattern part 414 may be a pad including a first hole 414-2 through which the second wire part 440 passes. Accordingly, the second wire part 440 is soldered while passing through the first hole 414-2, and may be electrically connected to the first lead pattern 414-1 disposed around the first hole 414-2.

The first lead pattern part 414 includes a plurality. That is, the first lead pattern part 414 includes a plurality of first lead patterns. In addition, the plurality of first lead patterns are connected to the second wire part 440. In this case, the number of the first lead patterns may be equal to or less than the number of the second wire part 440. When the number of first lead patterns is the same as the number of the second wire part 440, all of the first lead patterns may be coupled to the connection wire. In addition, when the number of the first lead patterns is smaller than the number of the second wire part 440, at least one of the first lead patterns may not be coupled to the connection wire.

A connector may be disposed in the second substrate region 412 connected to the first substrate region 411. The connector may be a port for electrically connecting to an external device.

In this case, the first substrate region 411 may be disposed inside the camera device, and the second substrate region 412 may extend from the first substrate region 411 to be exposed to the outside of the camera device.

That is, the first substrate region 411 may be disposed inside the first case 300, and the second substrate region 412 may include a connector disposed outside the first case 300 and connected to an external device.

The first substrate 410 may transmit a signal to the moving part 420 or receive a signal transmitted from the moving part 420. That is, the first substrate 410 is electrically connected to the moving part 420 through the second wire part 440, and accordingly, a power signal or a communication signal is transmitted to the moving part 420 through the second wire part 440, and information including an image signal obtained by the moving part 420 may be received.

The first substrate 410 may include a first pad part 415 disposed on an edge region of the first substrate region 411. The first pad part 415 may be electrically connected to the flexible circuit board 260 included in the first actuator 200.

At least one first coupling hole 416 is formed in a corner region of the first substrate region 411 of the first substrate 410. The first coupling hole 416 may be formed to fix the first substrate 410 on the first holder 410-1. Accordingly, a first coupling protrusion 410-1b may be formed at a position overlapping the first coupling hole 416 in the optical axis direction, on the upper surface of the first holder 410-1.

The first substrate 410 may be seated on the first holder 410-1 in a state in which the first coupling hole 416 is inserted into the first coupling protrusion 410-1b.

The first substrate 410 may include a gyro sensor (not shown) disposed on an upper surface or a lower surface of the first substrate region 411. That is, in the present embodiment, the gyro sensor (not shown) may be disposed on the first substrate 410 and received in the first case 300 of the camera device.

That is, in the present embodiment, a gyro sensor for implementing a hand-shake prevention function is embedded in a state mounted on the upper or lower surface of the first substrate 410, and angular velocity/linear velocity detection information due to hand shake may be feedback to the moving part 420. Accordingly, in the embodiment, the gyro sensor is disposed in the space between the first substrate 410 and the moving part 420, and accordingly, there is an effect that it is not necessary to provide an additional space for disposing the gyro sensor.

Meanwhile, a second pad may be disposed on a lower surface of the first substrate 410. The second pad may be a pad to which the first wire part 430 is connected. That is, pads corresponding to the number constituting the first wire part 430 may be formed on the lower surface of the first substrate 410. The second pad disposed on the lower surface of the first substrate 410 may be respectively connected to one end and the other end of the first wire part 430. Accordingly, the number of second pads disposed on the lower surface of the first substrate 410 may be twice the number of the first wire part 430.

The first wire part 430 may be a shape memory alloy (SMA). In addition, both ends of the first wire part 430 may be connected to the second pad of the first substrate 410. Accordingly, a length of the first wire part 430 may change according to a current applied through the second pad of the first substrate 410. The first wire part 430 is a shape memory alloy whose length is changed based on the applied current.

The first wire part 430 may include a plurality of first wires. For example, the first wire part 430 may include eight first wires, but is not limited thereto. However, the first wire part 430 may include at least six or more first wires.

Specifically, the first wire part 430 may include a first-first wire 431, a first-second wire 432, a first-third wire 433, a first-fourth wire 434, a first-fifth wire 435, a first-sixth wire 436, a first-seventh wire 437, and a first-eighth wire 438.

Specifically, the first wire part 430 may include a first-first wire 431 for moving the moving part 420 in a +x axis. In addition, the first wire part 430 may include a first-second wire 432 for moving the moving part 420 in a −x axis. In addition, the first wire part 430 may include a first-third wire 433 for moving the moving part 420 in a +y axis. In addition, the first wire part 430 may include a first-fourth wire 434 for moving the moving part 420 in a +y axis. In addition, the first wire part 430 may include a first-fifth wire 435 and a first-seventh 437 for rotating the moving part 420 in a first rotation direction (eg, clockwise with respect to the optical axis). In addition, the first wire part 430 may include a first-sixth wire 436 and a first-eighth 438 for rotating the moving part 420 in a second rotation direction (eg, counterclockwise). However, the embodiment is not limited thereto, and the first wire part 430 for rotating the moving part 420 in the first rotation direction or the second rotation direction may be formed as one.

Meanwhile, according to this embodiment, the second pad may include eight second pads to be respectively connected to the eight first wire part 430.

Specifically, the second pad may include a second-first pad 411-3. The second-first pad 411-3 may be disposed on a first side (eg, the +x-axis) with respect to the first open region 413. Specifically, the second-first pad 411-3 may include a first sub second-first pad 411-3a and a second sub second-first pad 411-3b spaced apart from each other in the y-axis direction on the first side of the first open region 413. The first sub second-first pad 411-3a and the second sub second-first pad 411-3b may be spaced apart from each other at the same distance from an extension point, based on the extension point extending in the x-axis direction from the center (C) of the first open region 413. One end of the first-first wire 431 is connected to the first sub second-first pad 411-3a, and the other end of the first-first wire 431 may be connected to the second sub second-first pad 411-3b. Also, a central portion (a portion coupled with a moving part (clearly a hinge part)) of the first-first wire 431 may meet the center C in the +x-axis direction in a state connected to the first sub second-first pad 411-3a and the second sub second-first pad 411-3b. Accordingly, in the embodiment, the moving part 420 can be accurately moved in the +x-axis direction using the first-first wire 431. Specifically, the first-first wire 431 may have a first length when no current is applied. Also, the first-first wire 431 may have a second length longer than the first length when a current is applied. Therefore, when a specific current value is applied to the first-first wire 431, the length of the first-first wire 431 may be shortened, and accordingly, the moving part 420 connected thereto can be moved along the +x axis.

In addition, the second pad may include a second-second pad 411-4. The second-second pad 411-4 may be disposed on a second side (eg, the −x-axis) with respect to the first open region 413. Specifically, the second-second pad 411-4 may include a first sub second-second pad 411-4a and a second sub second-second pad 411-4b spaced apart from each other in the y-axis direction on the second side of the first open region 413. The first sub second-second pad 411-4a and the second sub second-second pad 411-4b may be spaced apart from each other at the same distance from an extension point, based on the extension point extending in the x-axis direction from the center (C) of the first open region 413. One end of the first-second wire 432 is connected to the first sub second-second pad 411-4a, and the other end of the first-second wire 432 may be connected to the second sub second-second pad 411-4b. Also, a central portion (a portion coupled with a moving part (clearly a hinge part)) of the first-second wire 432 may meet the center C in the −x-axis direction in a state connected to the first sub second-second pad 411-4a and the second sub second-second pad 411-4b. Accordingly, in the embodiment, the moving part 420 can be accurately moved in the −x-axis direction using the first-second wire 432. That is, when a current is applied to the first-second wire 432, the moving part 420 connected to the first-second wire 432 may move along the −x axis.

In addition, the second pad may include a second-third pad 411-5. The second-third pad 411-5 may be disposed on a third side (eg, the +y-axis) with respect to the first open region 413. Specifically, the second-third pad 411-5 may include a first sub second-third pad 411-5a and a second sub second-third pad 411-5b spaced apart from each other in the x-axis direction on the third side of the first open region 413. The first sub second-third pad 411-5a and the second sub second-third pad 411-5b may be spaced apart from each other at the same distance from an extension point, based on the extension point extending in the +y-axis direction from the center (C) of the first open region 413. One end of the first-third wire 433 is connected to the first sub second-third pad 411-5a, and the other end of the first-third wire 433 may be connected to the second sub second-third pad 411-5b. Also, a central portion (a portion coupled with a moving part (clearly a hinge part)) of the first-third wire 433 may meet the center C in the +y-axis direction in a state connected to the first sub second-third pad 411-5a and the second sub second-third pad 411-5b. Accordingly, in the embodiment, the moving part 420 can be accurately moved in the +y-axis direction using the first-third wire 433. That is, when a current is applied to the first-third wire 433, the moving part 420 connected to the first-third wire 433 may move along the +y axis.

In addition, the second pad may include a second-fourth pad 411-6. The second-fourth pad 411-6 may be disposed on a fourth side (eg, the −y-axis) with respect to the first open region 413. Specifically, the second-fourth pad 411-6 may include a first sub second-fourth pad 411-6a and a second sub second-fourth pad 411-6b spaced apart from each other in the x-axis direction on the fourth side of the first open region 413. The first sub second-fourth pad 411-6a and the second sub second-fourth pad 411-6b may be spaced apart from each other at the same distance from an extension point in the x-axis direction, based on the extension point extending in the −y-axis direction from the center (C) of the first open region 413. One end of the first-fourth wire 434 is connected to the first sub second-fourth pad 411-6a, and the other end of the first-fourth wire 434 may be connected to the second sub second-fourth pad 411-6b. Also, a central portion (a portion coupled with a moving part (clearly a hinge part)) of the first-fourth wire 434 may meet the center C in the −y-axis direction in a state connected to the first sub second-fourth pad 411-6*a* and the second sub second-fourth pad 411-6*b*. Accordingly, in the embodiment, the moving part 420 can be accurately moved in the −y-axis direction using the first-fourth wire 434. That is, when a current is applied to the first-fourth wire 434, the moving part 420 connected to the first-fourth wire 433 may move along the −β axis.

Also, the second pad may include a second-fifth pad 411-7. The second-fifth pad 411-7 may be disposed on a first diagonal side (eg, a corner side where the first side and the fourth side meet) with respect to the first open region 413. Specifically, the second-fifth pad 411-7 may include a first sub second-fifth pad 411-7*a* and a second sub second-fifth pad 411-7*b* spaced apart from each other on the first diagonal side of the first open region 413. One end of the first-fifth wire 435 is connected to the first sub second-fifth pad 411-7*a*, and the other end of the first-fifth wire 435 may be connected to the second sub second-fifth pad 411-7*b*. In an embodiment, the moving part 420 may be rotated in a first rotation direction (eg, clockwise) using the first-fifth wire 435. That is, when a current is applied to the first-fifth wire 435, the moving part 420 connected to the first-fifth wire 435 may rotate in a first rotation direction.

Also, the second pad may include a second-sixth pad 411-8. The second-sixth pad 411-8 may be disposed on a second diagonal side (eg, a corner side where the second side and the fourth side meet) with respect to the first open region 413. Specifically, the second-sixth pad 411-8 may include a first sub second-sixth pad 411-8*a* and a second sub second-sixth pad 411-8*b* spaced apart from each other on the second diagonal side of the first open region 413. One end of the first-sixth wire 436 is connected to the first sub second-sixth pad 411-8*a*, and the other end of the first-sixth wire 436 may be connected to the second sub second-sixth pad 411-8*b*. In an embodiment, the moving part 420 may be rotated in a second rotation direction (eg, counterclockwise) using the first-sixth wire 436. That is, when a current is applied to the first-sixth wire 436, the moving part 420 connected to the first-sixth wire 436 may rotate in a second rotation direction.

Also, the second pad may include a second-seventh pad 411-9. The second-seventh pad 411-9 may be disposed on a third diagonal side (eg, a corner side where the second side and the third side meet) with respect to the first open region 413. Specifically, the second-seventh pad 411-9 may include a first sub second-seventh pad 411-9*a* and a second sub second-seventh pad 411-9*b* spaced apart from each other on the third diagonal side of the first open region 413. One end of the first-seventh wire 437 is connected to the first sub second-seven pad 411-9*a*, and the other end of the first-seventh wire 437 may be connected to the second sub second-seventh pad 411-9*b*. In an embodiment, the moving part 420 may be rotated in a first rotation direction (eg, clockwise) using the first-seventh wire 437. That is, when a current is applied to the first-seventh wire 437, the moving part 420 connected to the first-seventh wire 437 may rotate in a first rotation direction.

Also, the second pad may include a second-eighth pad 411-10. The second-eighth pad 411-10 may be disposed on a fourth diagonal side (eg, a corner side where the first side and the third side meet) with respect to the first open region 413. Specifically, the second-eighth pad 411-10 may include a first sub second-eighth pad 411-10*a* and a second sub second-eighth pad 411-10*b* spaced apart from each other on the fourth diagonal side of the first open region 413. One end of the first-eighth wire 438 is connected to the first sub second-eighth pad 411-10*a*, and the other end of the first-eighth wire 438 may be connected to the second sub second-eighth pad 411-10*b*. In an embodiment, the moving part 420 may be rotated in a second rotation direction (eg, counterclockwise) using the first-eighth wire 438. That is, when a current is applied to the first-eighth wire 438, the moving part 420 connected to the first-eighth wire 438 may rotate in a second rotation direction.

As described above, in the embodiment, the moving part 420 can be moved with respect to the fixed part 410 by using the first wire part 430 of the shape memory alloy in a state in which the moving part 420 is elastically supported with respect to the fixed part 410 using the second wire part 440.

Meanwhile, one end of the second wire part 440 is coupled to the first lead pattern part 414 of the first substrate 410, and it may extend below the first substrate 410 through a first hole 414-2 constituting the first lead pattern part 414.

In addition, a gyro sensor is disposed on one surface of the first substrate 410 to obtain sensing information necessary to perform hand shake correction, and a signal obtained through the gyro sensor may be transmitted to a substrate constituting the moving part 420 through the second wire part 440.

The moving part 420 is electrically connected to the fixed part 410 (Clearly, the first substrate 410) through the second wire part 440, and it may move relative to the fixed part 410 by the driving force provided through the first wire part 430.

The moving part 420 may include a second substrate 421, an image sensor 422, a second holder 423, and a third substrate 600.

In this case, the first substrate 410 may be a first substrate part constituting the fixed part, and the second substrate 421 and the third substrate 600 may be a second substrate part constituting the moving part 420.

The second substrate 421 may be an image sensor substrate. That is, the second substrate 421 may be a substrate on which the image sensor 422 is mounted. An image sensor 422 may be mounted on an upper surface of the second substrate 421. Preferably, the image sensor 422 may be disposed in a region overlapping the first open region 413 of the first substrate 410 in the optical axis among the upper surface of the second substrate 421.

A hinge part may be disposed on the upper surface of the second substrate 421. The hinge part may be a wire fixing part to which the first wire part 430 electrically connected to the first substrate 410 is coupled and fixed. The hinge part may include a plurality.

For example, the upper surface of the second substrate 421 includes a plurality of first regions corresponding to corner regions and a second region between the plurality of first regions. The hinge part includes a first hinge part disposed in a first region of the upper surface of the second substrate 421 and a second hinge part disposed in a second region of the upper surface of the second substrate 421. In addition, the first wire part 430 may include a first group first wire part connected to the first hinge part and a second group second wire part connected with the second hinge part. For example, the first group first wire part may be a first wire for rotating the second substrate 421 and the wire sensor 422 disposed on the second substrate 421 with respect to an optical axis. In addition, the second group first wire part may be a first wire for moving the second substrate 421 and the wire sensor 422 disposed on the second substrate 421 in the x-axis direction or the y-axis direction.

The hinge part may include a first hinge 421-1. A first-first wire 431 may be coupled and fixed to the first hinge 421-1. In this case, the first hinge 421-1 may be disposed on a first side (+x-axis direction) of the image sensor 422. In this case, a central portion between one end and the other end of the first-first wire 431 may be coupled to the first hinge 421-1. In addition, the first hinge 421-1 may not overlap the plurality of second-first pads 411-3 and a region between the plurality of second-first pads 411-3 in the optical axis direction. That is, when the first hinge 421-1 overlaps the second-first pad 411-3, the second substrate 421 may not move in the +x-axis by the first-first wire 431, but may only move in the z-axis. Accordingly, the first hinge 421-1 and the second-first pad 411-3 may be disposed to be shifted from each other in the optical axis direction.

The hinge part may include a second hinge 421-2. A first-second wire 432 may be coupled and fixed to the second hinge 421-2. In this case, the second hinge 421-2 may be disposed on a second side (−x-axis direction) of the image sensor 422. In this case, a central portion between one end and the other end of the first-second wire 432 may be coupled to the second hinge 421-2. In addition, the second hinge 421-2 may not overlap the plurality of second-second pads 411-4 and a region between the plurality of second-second pads 411-4 in the optical axis direction. That is, when the second hinge 421-2 overlaps the second-second pad 411-4, the second substrate 421 may not move in the −x-axis by the first-second wire 431, but may only move in the z-axis. Accordingly, the second hinge 421-2 and the second-second pad 411-4 may be disposed to be shifted from each other in the optical axis direction.

The hinge part may include a third hinge 421-3. A first-third wire 433 may be coupled and fixed to the third hinge 421-3. In this case, the third hinge 421-3 may be disposed on a third side (+y-axis direction) of the image sensor 422. In this case, a central portion between one end and the other end of the first-third wire 433 may be coupled to the third hinge 421-3. Also, the third hinge 421-3 may not overlap the plurality of second-third pads 411-5 and a region between the plurality of second-third pads 411-5 and in the optical axis direction.

The hinge part may include a fourth hinge 421-4. A first-fourth wire 434 may be coupled and fixed to the fourth hinge 421-4. In this case, the fourth hinge 421-4 may be disposed on a fourth side (−y-axis direction) of the image sensor 422. In this case, a central portion between one end and the other end of the firth-fourth wire 434 may be coupled to the fourth hinge 421-4. In addition, the fourth hinge 421-4 may not overlap the plurality of second-fourth pads 411-6 and a region between the plurality of second-fourth pads 411-6 in the optical axis direction.

The hinge part may include a fifth hinge 421-5. A first-fifth wire 435 may be coupled and fixed to the fifth hinge 421-5. In this case, the fifth hinge 421-5 may be disposed on a first diagonal side of the image sensor 422. At this time, a central portion between one end and the other end of the first-fifth wire 435 may be coupled to the fifth hinge 421-5. In addition, the fifth hinge 421-5 may not overlap the plurality of second-fifth pads 411-7 and a region between the plurality of second-fifth pads 411-7 in the optical axis direction.

The hinge part may include a sixth hinge 421-6. A first-sixth wire 436 may be coupled and fixed to the sixth hinge 421-6. In this case, the sixth hinge 421-6 may be disposed on a second diagonal side of the image sensor 422. In this case, a central portion between one end and the other end of the first-sixth wire 436 may be coupled to the sixth hinge 421-6. In addition, the sixth hinge 421-6 may not overlap the plurality of second-sixth pads 411-8 and a region between the plurality of second-sixth pads 411-8 in the optical axis direction.

The hinge part may include a seventh hinge 421-7. A first-seventh wire 437 may be coupled and fixed to the seventh hinge 421-7. In this case, the seventh hinge 421-7 may be disposed on a third diagonal side of the image sensor 422. In this case, a central portion between one end and the other end of the first-seventh wire 437 may be coupled to the seventh hinge 421-7. In addition, the seventh hinge 421-7 may not overlap the plurality of second-seventh pads 411-9 and a region between the plurality of second-seventh pads 411-9 in the optical axis direction.

The hinge part may include an eighth hinge 421-8. A first-eighth wire 438 may be coupled and fixed to the eighth hinge 421-8. In this case, the eighth hinge 421-8 may be disposed on a fourth diagonal side of the image sensor 422. In this case, a central portion between one end and the other end of the first-eighth wire 438 may be coupled to the eighth hinge 421-8. In addition, the eighth hinge 421-8 may not overlap between the plurality of second-eighth pads 411-10 and a region between the plurality of second-eighth pads 411-10 in the optical axis direction.

As described above, the hinge part to which the first wire part 430 is coupled is disposed on the upper surface of the second substrate 421. In addition, as a current is applied to the first wire part 430 in the second substrate 421, the hinge connected to the first wire part to which the current is applied moves toward the direction in which the first substrate 410 is positioned.

Meanwhile, a pad 421a may be formed on a lower surface of the second substrate 421. The pad 421a may be formed in an edge region of a lower surface of the second substrate 421. The pad 421a of the second substrate 421 may be a pad connected to the third substrate 600. The pad 421a includes a first sub pad 421a1 formed in a first edge region of the lower surface of the second substrate 421, a second sub pad 421a2 formed in a second edge region, a third sub pad 421a3 formed in a third edge, and a fourth sub pad 421a4 formed in a fourth edge region.

Meanwhile, the second substrate 421 may be disposed on a second holder 423. The second holder 423 may have a guide protrusion (not shown) extending upward in an edge region. In addition, the second substrate 421 may be seated on the second holder 423 through the guide protrusion, thereby guiding an assembly position of the second substrate 421.

An open region OR2 may be formed in a central region of the second holder 423. In addition, a through hole 423-1 may be formed in an edge region of the second holder 423. The through hole 423-1 may be aligned with the first hole 414-2 formed in the first substrate 410 in the optical axis direction. The through hole 423-1 may be a wire through hole through which the second wire part 440 coupled to the first substrate 410 passes.

The third substrate 600 may be disposed between the first substrate 410 and the second substrate 421. The third substrate 600 may relay electrical connection (or communication) between the first substrate 410 and the second substrate 421.

The third substrate 600 enables the shift of the image sensor 422 and enables signal exchange between the first substrate 410 and the second substrate 421.

The third substrate 600 may include an insulating layer 610 and a pattern part 620 disposed on the insulating layer 610.

The insulating layer 610 may include an opening 612. The opening 612 may be aligned with the opening of the first substrate 410, the second substrate 421, and the image sensor 422 in the optical axis direction.

A pattern part 620 is disposed on the insulating layer 610. In this case, the pattern part 620 includes a second lead pattern part 621 having one end connected to the pad 421a of the second substrate 421 and the other end connected to the second wire part 440. Also, the pattern part 620 includes a reinforcing pattern 622 disposed on a corner region of the insulating layer 610. The second lead pattern part 621 is a signal transmission/reception pattern electrically connected to the pad 421a of the second substrate 421 and the second wire part 440. In addition, the reinforcing pattern 622 is disposed on the corner region of the insulating layer 610 to reinforce the rigidity of the third substrate 600. Accordingly, the reinforcing pattern 622 is not electrically connected to other components, and is only disposed in a corner region of the upper surface of the insulating layer 610 where the second lead pattern part 621 is not disposed, so that the rigidity of the third substrate 600 is improved. In this case, the reinforcing pattern 622 may be formed of the same metal material as the second lead pattern part 621, and may be formed simultaneously with the second lead pattern part 621 in the same process.

A plurality of second lead pattern parts 621 may be formed. For example, the second lead pattern part 621 may include 36 terminal parts corresponding to the second wire part 440.

In this case, the second lead pattern part 621 may include a second-first lead pattern part 621a disposed in a first region of the insulating layer 610, a second-third lead pattern part 621c disposed in a second region facing the first region of the insulating layer 610, a second-second lead pattern part 621b disposed in a third region between the first and second regions of the insulating layer 610, and a second-fourth lead pattern part 621d disposed in a fourth region facing the third region of the insulating layer 610. That is, the second lead pattern part 621 may include a plurality of second lead patterns respectively disposed in different regions. In this case, the number of the second lead patterns may be the same as the number of the second wire part 440. Also, the number of the second lead patterns may be less than the number of the connection wires. In this case, when the number of second lead patterns is smaller than the number of the connection wires, at least one of the second lead patterns may not be coupled to the connection wire.

In addition, the reinforcing pattern 622 may include a first reinforcing pattern 622-1a disposed in a first corner region between the first and third regions of the insulating layer 610, a second reinforcing pattern 622-1b disposed in a second corner region between the second region and third region of the insulating layer 610, a third reinforcing pattern 622-1c disposed in a third corner region between the second region and the fourth region of the insulating layer 610, and a fourth reinforcing pattern 622-1d disposed in a fourth corner region between the first region and the fourth region of the insulating layer 610.

In this case, the insulating layer 610 includes a first insulating region 611 having an opening 612 in a central portion thereof and in contact with the second lead pattern part 621 and the reinforcing pattern 622, and a second insulating region 613 protruding outward from the outer surface of the first insulating region 611. The second insulating region 613 may be formed to further improve the rigidity of the third substrate 600 by increasing a contact area with the reinforcing pattern 622.

On the other hand, the second lead pattern part 621 may include a first portion 621-1 disposed on the insulating layer 610, a third portion 621-3 coupled to the second wire part 440, a second portion 621-2 connecting between the first portion 621-1 and the third portion 621-3, and a fourth portion 621-4 extending from the first portion 621-1 in an inner direction of the insulating layer 610 and coupled to the pad 421a of the second substrate 421.

Here, the first portion 621-1 may be referred to as a body part of the second lead pattern part 621. That is, the first portion 621-1 may be a body part of the second lead pattern part 621 disposed on the insulating layer to support another portion thereof. Also, the third portion 621-3 may be referred to as a coupling part coupled to the second wire part 440. Also, the second portion 621-2 may be a connecting part connecting the first portion 621-1 and the third portion 621-3. In addition, the fourth portion 621-4 may be referred to as a coupling part coupled to the pad 421a of the second substrate 421, or alternatively may be referred to as a pad part.

Also, a hole through which the second wire part 440 passes may be formed in the third portion 621-3. The third portion 621-3 may be coupled to the second wire part 440 by soldering. The second portion 621-2 may include a bent portion. The second portion 621-2 may be bent a plurality of times in one direction. The second portion 621-2 may have elasticity. Accordingly, the second lead pattern part 621 may have elasticity.

At this time, when the second portion 621-2 does not include the bent portion, the second wire part 440 may be bent as it moves together with the image sensor 422, and breakage may occur depending on the degree of occurrence of the bent. Unlike this, in the embodiment, the second portion 621-2 includes a bent portion, thereby it can serve as a suspender when the image sensor module 400 moves, and accordingly, elasticity of the second wire part 440 may be imparted to increase the rigidity of the second wire part 440.

The fourth portion 621-4 may be electrically connected to the pad 421a of the second substrate 421. In this case, the insulating layer 610 is disposed only under the first portion 621-1 of the second lead pattern part 621, and the insulating layer 610 is not disposed on the other portion of the second lead pattern part 621.

The third portion 621-3 may be a bonding pad electrically connected to the second wire part 440. That is, the third portion 621-3 may be a soldering pad that is soldered to the second wire part 440. To this end, the third portion 621-3 may include a hole through which the second wire part 440 passes. The hole of the third portion 621-3 may be aligned with a hole through or through which the second wire part 440 described above passes in the optical axis direction. To this end, the second portion 621-2 may include a plurality of bent portions that are bent.

In this case, each of the second lead pattern parts 621a, 621b, 621c, and 621d may be bent in the same direction. For example, each of the second lead pattern parts 621a, 621b, 621c, and 621d may include a bent portion in which the second portion 621-2 rotates in a clockwise direction. That is, the second portion 621-2 may be bent in a direction corresponding to the rotation direction in the z-axis direction of the image sensor module. Accordingly, the second portion 621-2 can minimize damage applied to the second lead pattern part 621 when the second portion 621-2 rotates in the z-axis direction, and accordingly, it is possible to inhibit cracks occurring in the second lead pattern part 621 or separation of the second lead pattern part 621 from the insulating layer 610. Meanwhile, in the embodiment, an adhesive member (not shown) may be disposed between the insulating layer 610 and the second lead pattern part 621. The adhesive member may be interposed between the insulating layer 610 and the second lead pattern part 621 to inhibit the second lead pattern part 621 from being separated from the insulating layer 610. The adhesive member may include a curing adhesive. In addition, the adhesive member may be electrolytically plated to increase adhesion with the second lead pattern part 621, and thus roughness may be imparted to the surface.

Meanwhile, the second lead pattern part 621 is a wire that transmits an electrical signal, and may be formed of a metal material having high electrical conductivity. To this end, the second lead pattern part 621 may be formed of at least one metal material selected from gold (Au), silver (Ag), platinum (Pt), titanium (Ti), tin (Sn), copper (Cu), and zinc (Zn). In addition, the second lead pattern part 621 may be formed of a paste or solder paste including at least one metal material selected from gold (Au), silver (Ag), platinum (Pt), titanium (Ti), tin (Sn), copper (Cu), and zinc (Zn) having excellent bonding strength.

Preferably, the second lead pattern part 621 may be formed of a metal material having an elastic force that can move the image sensor 422 in the X-axis, Y-axis and Z-axis directions while serving as a wiring for transmitting an electrical signal. To this end, the second lead pattern part 621 may be formed of a metal material having a tensile strength of 1000 MPa or more. For example, the second lead pattern part 621 may be a binary alloy or a ternary alloy including copper. For example, the second lead pattern part 621 may be a binary alloy of copper (Cu)-nickel (Ni). For example, the second lead pattern part 621 may be a binary alloy of copper (Cu)-tin (Sn). For example, the second lead pattern part 621 may be a binary alloy of copper (Cu)-beryllium (Be). For example, the second lead pattern part 621 may be a binary alloy of copper (Cu)-cobalt (Co). For example, the second lead pattern part 621 may be a ternary alloy of copper (Cu)-nickel (Ni)-tin (Sn). For example, the second lead pattern part 621 may be a ternary alloy of copper (Cu)-beryllium (Be)-cobalt (Co). In addition to the above metal materials, the second lead pattern part 621 may be formed of an alloy such as iron (Fe), nickel (Ni), zinc, etc., which has good electrical properties while having an elastic force that can serve as a spring. In addition, the second lead pattern part 621 may be surface-treated with a plating layer including a metal material such as gold (Au), silver (Ag), palladium (Pd), and the like, thereby improving electrical conductivity.

Meanwhile, the second lead pattern part 621 may be formed by an additive process, a subtractive process, a modified semi-additive process (MSAP), and a semi-additive process (SAP), which is a typical printed circuit board manufacturing process.

Meanwhile, the second lead pattern part 621 may have partially different line widths. The first portion 621-1 may have a wider width than other portions to increase adhesion with the insulating layer 610. In addition, the second portion 621-2 may have a narrower line width than the first portion 621-1 in order to have an elastic force. In this case, the second portion 621-2 may have a line width of 20 to 1000 µm. When the line width of the second portion 621-2 is less than 20 µm, the overall rigidity of the second lead pattern part 621 may decrease, and thus the reliability of the second lead pattern part 621 may be reduced. In addition, when the line width of the second portion 621-2 is greater than 1000 µm, the elastic force of the second lead pattern part 621 may be lowered, and thus a problem may occur in shifting of the image sensor 422.

Meanwhile, the second portion 621-2 may include a buffer pattern part for a buffer role in a region (A) connected to the first portion 621-1. The buffer pattern part may have a shape in which the width gradually decreases from the first portion 621-1 to the second portion 621-2. In this case, the decrease in the width has a non-linear characteristic rather than a linear, and thus the outer surface of the buffer pattern part may have a rounded shape.

The buffer pattern part can solve problems such as pattern breakage caused by the pattern width difference between the first portion 621-1 and the second portion 621-2, it is possible to stably connect the first portion 621-1 and the third portion 621-3.

Also, the buffer pattern part may not overlap the insulating layer in a vertical direction. Through this, when the substrate is not only moved in the X-axis, Y-axis, and Z-axis, but also when it is tilted, a point where the connecting part and the pattern part are connected does not exist on the insulating layer, but is formed outside the insulating layer, so that pattern breakage caused by a difference in width between the connecting part and the pattern part can be effectively reduced.

In addition, the fourth portion 621-4 also has a smaller line width than the first portion 621-1, and accordingly, a buffer pattern part having a rounded outer surface may be disposed in the region (B) between the fourth portion 621-4 and the first portion 621-1.

Meanwhile, the second portion 621-2 may be bent at least once as set above. Accordingly, the second portion 621-2 includes a second-first portion 621-2a extending in one direction, and a second-second portion 621-2b bent in a direction different from the one direction from the second-first portion 621-2a.

In this case, a side surface of the second-second portion 621-2b may have a rounded shape rather than a straight line. That is, when the side surface of the second-second portion 621-2b has a linear shape, stress may be concentrated in this portion, and accordingly, the second lead pattern part 621 may be broken. Accordingly, the side surfaces of the second-second portion 621-2b may have a rounded shape to inhibit stress from being concentrated in the second-second portion 621-2b. In this case, a curvature value R of the side surface of the second-second portion 621-2b is set to be between 30 and 100. When the curvature value R of the side surface is less than 30, the stress concentration prevention effect is insignificant, and when the curvature value R is greater than 100, the elastic force of the second lead pattern part 621 may be reduced. In this case, the second-second portion 621-2b may include an inner surface and an outer surface according to the bending direction. In addition, the curvature value R of the inner surface of the second-second portion 621-2b is different from the curvature value R of the outer surface of the second-second portion 621-2b, and accordingly, the stress relaxation function can be further improved.

Also, the second-second portion 621-2b may be different from the line width of the second-first portion 621-2a. For example, the second-second portion 621-2b may have a line width greater than that of the second-first portion 621-2a This is, the stress may be concentrated in the second-second portion 621-2b, and accordingly, the second-second portion 621-2b is made to have a larger line width than the second-first portion 621-2a.

Meanwhile, the pad 421a of the second substrate 421 is positioned on the fourth portion 621-4. In addition, the fourth portion 621-4 and the pad 421*a* of the second substrate 421 may be coupled to each other by soldering.

Meanwhile, although it has been described above that the second portion 621-2 of the second lead pattern part 621 has a rectangular shape with rounded corners, the embodiment is not limited thereto. For example, the second portion 621-2 of the second lead pattern part 621 may have a circular shape or a polygonal shape and may be bent.

<Optical Device>

Hereinafter, an optical device according to the present embodiment will be described with reference to the drawings.

Figure 20:
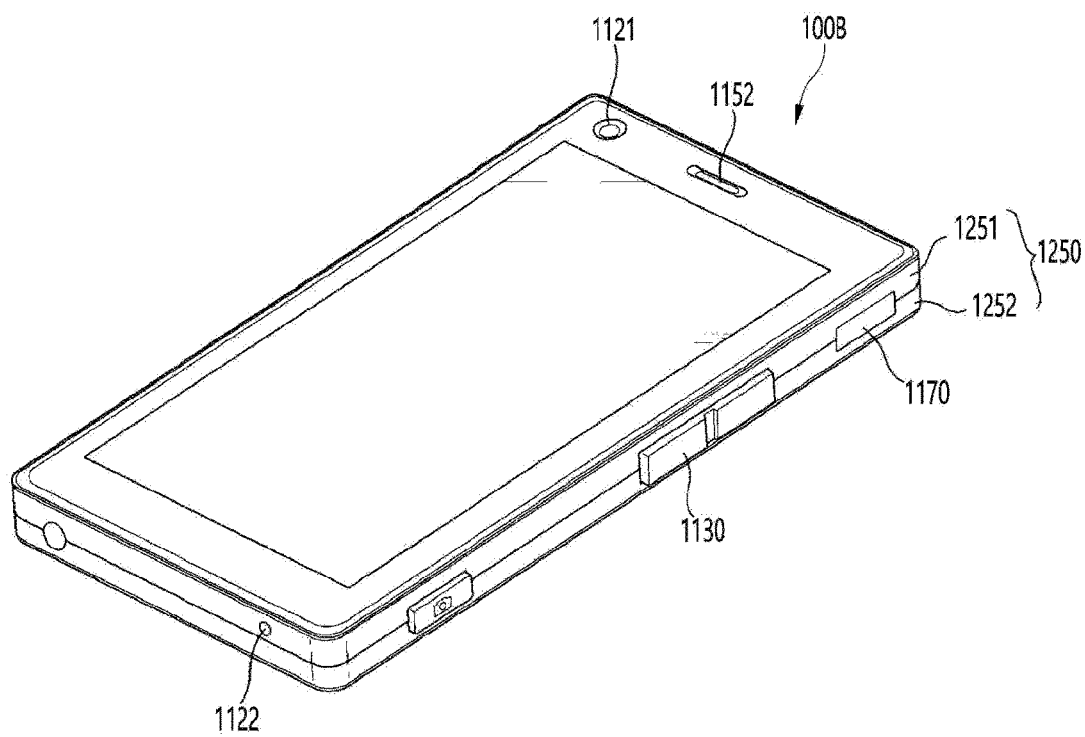
FIG. 20 is a perspective view of an optical device according to the present embodiment.
Figure 21:
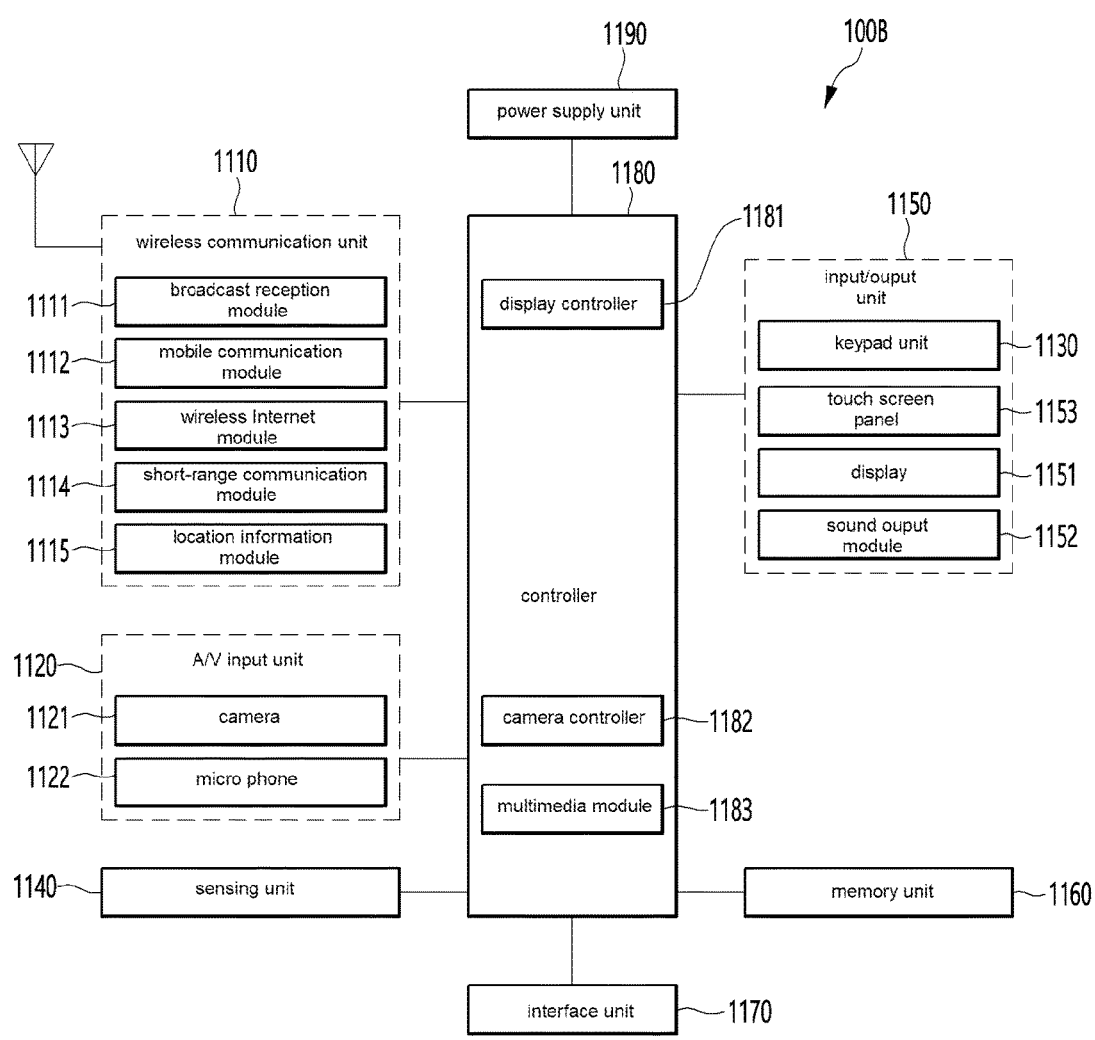
FIG. 21 is a block diagram of the optical device shown in FIG. 20.

FIG. 20 is a perspective view of an optical device according to the present embodiment, and FIG. 21 is a block diagram of the optical device shown in FIG. 20.

The optical device may be any one of a cell phone, a mobile phone, a smart phone, a portable smart device, a digital camera, a laptop computer, a digital broadcasting terminal, a PDA (Personal Digital Assistants), a PMP (Portable Multimedia Player), and a navigation device. However, the type of optical device is not limited thereto, and any device for taking an image or photo may be included in the optical device.

The optical device may include a body 1250. The body 1250 may have a bar shape. Alternatively, the body 1250 may have various structures such as a slide type, a folder type, a swing type, a swivel type, in which two or more sub-bodies are coupled to be movable relative to each other. The body 1250 may include a case (casing, housing, or cover) forming an exterior. For example, the body 1250 may include a front case 1251 and a rear case 1252. Various electronic components of an optical device may be embedded in a space formed between the front case 1251 and the rear case 1252. A display 1151 may be disposed on one surface of the body 1250. A camera 1121 may be disposed on one or more surfaces of one surface of the body 1250 and the other surface disposed opposite to the one surface.

The optical device may include a wireless communication unit 1110. The wireless communication unit 1110 may include one or more modules that enable wireless communication between the optical device and the wireless communication system or between the optical device and a network in which the optical device is located. For example, the wireless communication unit 1110 may include any one or more of a broadcast reception module 1111, a mobile communication module 1112, a wireless Internet module 1113, a short-range communication module 1114, and a location information module 1115.

The optical device may include an AN input unit 1120. The AN (Audio/Video) input unit 1120 is for inputting an audio signal or a video signal, and may include any one or more of a camera 1121 and a microphone 1122. In this case, the camera 1121 may include the camera device according to the present embodiment.

The optical device may include a sensing unit 1140. The sensing unit 1140 may detect a current state of the optical device, such as open/close status of optical device, position of optical device, presence of user contact, bearing of optical device, acceleration/deceleration of optical device, and generate a sensing signal for controlling the operation of the optical device. For example, when the optical device is in the form of a slide phone, it is possible to sense whether the slide phone is opened or closed. In addition, it may be responsible for sensing functions related to whether the power supply unit 1190 supplies power, whether the interface unit 1170 is coupled to an external device, and the like.

The optical device may include an input/output unit 1150. The input/output unit 1150 may be configured to generate an input or output related to visual, auditory, or tactile sense. The input/output unit 1150 may generate input data for controlling the operation of the optical device, and may output information processed by the optical device.

The input/output unit 1150 may include any one or more of a keypad unit 1130, a display 1151, a sound output module 1152, and a touch screen panel 1153. The keypad unit 1130 may generate input data in response to a keypad input. The display 1151 may output an image captured by the camera 1121. The display 1151 may include a plurality of pixels whose color changes according to an electrical signal. For example, the display 1151 may include at least one of a liquid crystal display, a thin film transistor-liquid crystal display, an organic light-emitting diode, a flexible display, or a three-dimensional display (3D display). The sound output module 1152 may output audio data received from the wireless communication unit 1110 in a call signal reception, a call mode, a recording mode, a voice recognition mode, or a broadcast reception mode, or audio data stored in the memory unit 1160. The touch screen panel 1153 may convert a change in capacitance generated due to a user's touch on a specific region of the touch screen into an electrical input signal.

The optical device may include a memory unit 1160. A program for processing and control of the controller 1180 may be stored in the memory unit 1160. Also, the memory unit 1160 may store input/output data, for example, any one or more of a phone book, a message, an audio, a still image, a photo, and a moving image. The memory unit 1160 may store an image captured by the camera 1121, for example, a photo or a video.

The optical device may include an interface unit 1170. The interface unit 1170 serves as a passage for connecting to an external device connected to the optical device. The interface unit 1170 may receive data from an external device, receive power and transmit it to each component inside the optical device, or transmit data inside the optical device to the external device. The interface unit 1170 may include any one or more of a wired/wireless headset port, an external charger port, a wired/wireless data port, a memory card port, a port for connecting a device having an identification module, and an audio I/O (Input/Output), a video input/output (I/O) port, and an earphone port.

The optical device may include a controller 1180. The controller 1180 may control the overall operation of the optical device. The controller 1180 may perform related control and processing for voice call, data communication, video call, and the like. The controller 1180 may include a multimedia module 1181 for playing multimedia. The multimedia module 1181 may be provided within the controller 1180 or may be provided separately from the controller 1180. The controller 1180 may perform a pattern recognition process capable of recognizing a handwriting input or a drawing input performed on the touch screen as characters and images, respectively.

The optical device may include a power supply unit 1190. The power supply unit 1190 may receive external power or internal power under the control of the controller 1180 to supply power required for operation of each component.

According to an embodiment, in order to implement the OIS and AF functions of the camera module, the image sensor is moved relative to the lens barrel in the X-axis, Y-axis and Z-axis directions instead of moving the lens barrel in the prior art. Accordingly, the camera module according to the embodiment can eliminate the complex spring structure for implementing the OIS and AF functions, and accordingly, the structure may be simplified. In addition, by moving the image sensor according to the embodiment relative to the lens barrel, it is possible to form a stable structure compared to the prior art.

In addition, according to an embodiment, the second substrate to which the image sensor is attached is relatively moved with respect to the first substrate by using a wire made of a shape memory alloy. According to this, in the embodiment, it is possible to remove components such as a magnet or a coil necessary for the OIS operation, and accordingly, the product cost can be reduced. In addition, according to an embodiment, the overall thickness of the camera module may be slimmed by removing the above components. In addition, according to the embodiment, the driving part for the OIS operation uses a shape memory alloy wire, and accordingly, magnetic field interference with the AF module can be completely resolved.

In addition, according to an embodiment, the terminal part electrically connected to the image sensor has a spring structure and is floated and disposed in a position that does not overlap in the vertical direction with the insulating layer. Accordingly, the camera module may move the image sensor with respect to the lens barrel while stably elastically supporting the image sensor.

According to the above embodiment, the X-axis direction shift, Y-axis direction shift, and Z-axis rotation corresponding to hand shake may be performed with respect to the image sensor, and hand shake correction of the lens corresponding to the hand shake compensation of the image sensor may be performed together, and through this, it is possible to provide a more improved image stabilization function.

In addition, according to an embodiment, AF is performed using a first actuator implementing a lens shift method, OIS is performed using a second actuator that implements an image sensor shift method, and accordingly, the reliability of the camera device can be improved.

Also, according to an embodiment, the first actuator and the second actuator are operated using a gyro sensor supporting a 6-axis (eg, 3-axis accelerometer and 3-axis gyroscope) dual interface. Specifically, the first actuator and the second actuator must receive gyro data from the gyro sensor to implement the autofocus function and the handshake correction function. In this case, in the embodiment, the gyro data obtained from one gyro sensor supporting the dual interface is provided to the first and second actuators. According to this, in the embodiment, the first actuator and the second actuator are operated based on the gyro data acquired at the same time point and the same position, accordingly, the mutual compensation operation of the autofocus function and the image stabilization function can be synchronized, and accordingly, reliability may be improved. In addition, in the embodiment, the first actuator and the second actuator are operated based on the gyro data acquired at the same time point and the same location, and accordingly, the accuracy of the autofocus function and the image stabilization function may be improved.

An embodiment of the present invention has been described above with reference to the accompanying drawings. However, those skilled in the art to which the present invention pertains will be able to understand that the present invention may be embodied in other specific forms without changing the technical spirit or essential features thereof. Therefore, it should be understood that the embodiments described above are illustrative in all respects and not restrictive.

What is claimed is:

1. A sensor driving device comprising:
   a fixed part including a first substrate on which a plurality of first pads are provided;
   a moving part spaced apart from the fixed part and including a sensor; and
   a wire part disposed between the moving part and the fixed part,
   wherein the wire part includes:
      a first wire part of a shape memory alloy having both ends connected to the plurality of first pads and configured to move the moving part with respect to the fixed part; and
      a second wire part having one end connected to the fixed part and an other end connected to the moving part to elastically support the moving part with respect to the fixed part, and
   wherein the first wire part is configured to move the moving part in a first axis direction perpendicular to an optical axis direction, move the moving part in a second axis direction perpendicular to the first axis direction and the optical axis direction, and rotate the moving part in the optical axis direction as a rotation axis.

2. The sensor driving device of claim 1, wherein the moving part includes a second substrate on which the sensor is disposed, and
   wherein the second substrate includes a hinge part to which the first wire part is coupled.

3. The sensor driving device of claim 2, wherein the first wire part includes a plurality of wires, and
   wherein the hinge part includes a plurality of hinges corresponding to a number of the plurality of wires of the first wire part.

4. The sensor driving device of claim 2, wherein the moving part includes a third substrate connected to the second substrate, and
   wherein the third substrate includes an opening in which the second substrate is disposed.

5. The sensor driving device of claim 4, wherein the first substrate includes a first lead pattern part,
   wherein the third substrate includes a second lead pattern part,
   wherein one end of the second wire part is connected to the first lead pattern part, and
   wherein the other end of the second wire part is connected to one end of the second lead pattern part.

6. The sensor driving device of claim 5, wherein the second substrate includes a second pad, and
   wherein an other end of the second lead pattern part is connected to the second pad.

7. The sensor driving device of claim 5, wherein the second lead pattern part includes:
   a body part;
   a coupling part coupled to the other end of the second wire part; and
   a connecting part connecting the body part and the coupling part.

8. The sensor driving device of claim 5, wherein the first lead pattern part includes a plurality of first lead patterns,
   wherein the second lead pattern part includes a plurality of second lead patterns,
   wherein the second wire part includes a plurality of second wires, and
   wherein a number of the plurality of second wires is equal to or less than a number each of the plurality of first lead patterns and the plurality of second lead patterns.

9. The sensor driving device of claim 6, wherein the third substrate includes an insulating layer on which the second lead pattern part is disposed, and wherein one end of the second lead pattern part connected to the second wire part and the other end of the second lead pattern part connected to the second pad do not overlap the insulating layer in the optical axis direction.

10. The sensor driving device of claim 7, wherein the connecting part of the second lead pattern part includes a bending region.

11. The sensor driving device of claim 1, wherein the plurality of first pads includes:

a plurality of first-first pads disposed on the first substrate in the first axis direction; and wherein the first wire part includes a first-first wire having both ends connected to the plurality of first-first pads.

12. The sensor driving device of claim 11, wherein the first substrate includes an open region, and wherein the plurality of first-first pads are disposed on a first side of the open region and a second side facing the first side, respectively.

13. The sensor driving device of claim 12, wherein the plurality of first pads includes:

a plurality of first-second pads disposed on the first substrate in the second axis direction; and wherein the first wire part includes a first-second wire having both ends connected to the plurality of first-second pads.

14. The sensor driving device of claim 13, wherein the first substrate includes an open region, and wherein the plurality of first and second pads are respectively disposed on a third side of the open region and a fourth side facing the third side.

15. The sensor driving device of claim 14, wherein the plurality of first pads includes a plurality of first-third pads disposed between the plurality of first-first pads and the plurality of first-second pads, and wherein the first wire part includes a first-third wire having both ends connected to the plurality of first-third pads.

16. The sensor driving device of claim 15, comprises:

a driving part for controlling a current applied to the first wire part and configured to move the moving part with respect to the fixed part.

17. The sensor driving device of claim 16, wherein the driving part is configured to:

control a current applied to the first-first wire to move the moving part in the second axis direction, control a current applied to the first-second wire to move the moving part in the first axis direction, and control a current applied to the first-third wires to rotate the moving part.

18. A camera module comprising:

an image sensor;

a lens module disposed on the image sensor;

a first actuator configured to drive the lens module; an a second actuator configured to drive the image sensor;

wherein the first actuator includes:

a fixed part including a first substrate on which a plurality of first pads are provided;

a moving part spaced apart from the fixed part and including a sensor; and a wire part disposed between the moving part and the fixed part, wherein the wire part includes:

a first wire part of a shape memory alloy having both ends connected to the plurality of first pads and configured to move the moving part with respect to the fixed part; and a second wire part having one end connected to the fixed part and the other end connected to the moving part to elastically support the moving part with respect to the fixed part, wherein the moving part includes a second substrate including a hinge part on which the sensor is disposed and to which the first wire part is coupled, and wherein the first wire part is configured to move the moving part in a first axis direction perpendicular to an optical axis direction, move the moving part in a second axis direction perpendicular to the first axis direction and the optical axis direction, and rotate the moving part in the optical axis direction as a rotation axis.

19. The camera module of claim 18, wherein the first wire part includes:

at least one first-first wire configured to move the moving part in the first axis direction; and at least one first-second wire configured to move the moving part in the second axis direction.

20. The camera module of claim 19, wherein the first wire part further includes:

at least one wire first-third configured to rotate the moving part in the optical axis direction as the rotation axis.

* * * * *